United States Patent
Wen et al.

(10) Patent No.: US 12,538,304 B2
(45) Date of Patent: Jan. 27, 2026

(54) COMMUNICATION METHOD AND APPARATUS FOR RESOURCE ALLOCATION

(71) Applicant: HUAWEI TECHNOLOGIES CO., LTD., GuangDong (CN)

(72) Inventors: Ronghui Wen, Beijing (CN); Zheng Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 407 days.

(21) Appl. No.: 18/158,830

(22) Filed: Jan. 24, 2023

(65) Prior Publication Data

US 2023/0276437 A1    Aug. 31, 2023

Related U.S. Application Data

(63) Continuation of application No. PCT/CN2021/105387, filed on Jul. 9, 2021.

(30) Foreign Application Priority Data

Jul. 31, 2020  (CN) .......................... 202010762088.6

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0012* (2013.01); *H04L 27/26025* (2021.01);
(Continued)

(58) Field of Classification Search
CPC ......... H04W 72/1268; H04W 72/0453; H04W 74/0833; H04W 74/0836; H04W 74/0838;
(Continued)

(56) References Cited

U.S. PATENT DOCUMENTS

2010/0195614 A1* 8/2010 Nimbalker ............ H04L 1/0025
370/330
2012/0039273 A1* 2/2012 Nam .................... H04W 52/325
455/450
(Continued)

FOREIGN PATENT DOCUMENTS

| CN | 110832931 A | 2/2020 | |
|---|---|---|---|
| EP | 3681116 A1 | 7/2020 | |
| WO | WO-2014007531 A1 * | 1/2014 | ............ H04B 1/713 |

OTHER PUBLICATIONS

Vivo, "Remaining issues on physical UL channel design in unlicensed spectrum," 3GPP TSG RAN WG1 #100, e-meeting, Feb. 24-Mar. 6, 2020, R1-2000308; 9 total pages.
(Continued)

*Primary Examiner* — Thai Nguyen
(74) *Attorney, Agent, or Firm* — Rimon PC

(57) ABSTRACT

This application provides a communication method and apparatus. The method is applicable to a first terminal device, and the method includes that the first terminal device receives first uplink grant information. The method further includes that the first terminal device determines a resource for uplink transmission based on a first field in the first uplink grant information, and performs uplink transmission based on the resource. The first field is used for frequency domain resource allocation indication, a length Y of the first field is less than X, where X is a pre-specified value, or X is a length of a second frequency domain resource allocation field associated with a second uplink grant format. The first terminal device does not support the second uplink grant format. Y is related to a quantity N of resource blocks supported or configured by the first terminal device.

20 Claims, 3 Drawing Sheets

(51) Int. Cl.
  *H04L 27/26* (2006.01)
  *H04W 72/0453* (2023.01)
  *H04W 74/0833* (2024.01)
  *H04W 74/0836* (2024.01)
  *H04W 74/0838* (2024.01)
(52) U.S. Cl.
  CPC .... *H04W 72/0453* (2013.01); *H04W 74/0833* (2013.01); *H04W 74/0836* (2024.01); *H04W 74/0838* (2024.01)
(58) Field of Classification Search
  CPC . H04W 72/23; H04W 72/51; H04W 72/1263; H04W 72/231; H04W 74/0866; H04L 5/0012; H04L 27/26025
  See application file for complete search history.

(56) References Cited

U.S. PATENT DOCUMENTS

2018/0279285 A1* 9/2018 Yang ............... H04L 5/0092
2020/0245331 A1* 7/2020 Hussain ............ H04L 1/0001
2020/0351844 A1* 11/2020 Rico Alvarino ...... H04L 5/0094

OTHER PUBLICATIONS

Nokia, Nokia Shanghai Bell, "Data transmission during random access procedure," 3GPP TSG RAN WG1 Meeting #93, Busan, Korea, May 21-25, 2018, R1-1806173; 4 total pages.
ETRI, "Potential enhancements to PUSCH," 3GPP TSG RAN WG1 #96, Athens, Greece, Feb. 25-Mar. 1, 2019, R1-1902443; 8 total pages.

* cited by examiner

COMMUNICATION METHOD AND APPARATUS FOR RESOURCE ALLOCATION

CROSS-REFERENCE TO RELATED APPLICATIONS

This application is a continuation of International Application No. PCT/CN2021/105387, filed on Jul. 9, 2021, which claims priority to Chinese Patent Application No. 202010762088.6, filed on Jul. 31, 2020. The disclosures of the aforementioned applications are hereby incorporated by reference in their entireties.

TECHNICAL FIELD

This application generally relates to the field of communication technologies, and in particular, to a communication method and apparatus.

BACKGROUND

To cope with explosive growth of mobile data traffic in the future and various emerging new services and application scenarios, a 5th generation (5G) mobile communication system is emerging. The International Telecommunication Union (ITU) defines three application scenarios for 5G and future mobile communication systems: enhanced mobile broadband (eMBB), ultra-reliable low-latency communication (URLLC), and massive machine type communications (mMTC). Currently, low-complexity or reduced capability (REDCAP) user equipment (UE) may be less complex than other UEs in terms of a bandwidth, power consumption, and a quantity of antennas, for example, may have a narrower bandwidth, lower power consumption, and fewer antennas.

Types of random access performed by a UE include contention-based random access and non-contention-based random access. In a contention-based random access process, the UE first randomly selects a preamble sequence from a preconfigured preamble sequence range, and sends the preamble sequence on a preconfigured random access resource. If an access network device successfully receives the preamble sequence and allows the UE to perform access, the access network device sends, in a preconfigured random access response (RAR) window, an RAR to the UE, where the RAR includes downlink control information (DCI) and a physical downlink control channel (PDSCH). The DCI indicates scheduling information of the PDSCH, and the PDSCH carries uplink scheduling information used for sending a message 3. Then, the access network device determines, based on the uplink scheduling information in the PDSCH, a resource for sending the message 3. Therefore, before sending the message 3 to the UE, the access network device typically cannot obtain identification information of the UE. However, a dedicated random access resource and preamble sequence are used for non-contention-based random access. Therefore, the access network device obtains the identification information of the UE before sending the RAR to the UE. The access network device may determine a type of the UE based on the identification information of the UE, for example, may determine that the UE is an enhanced mobile broadband (eMBB) terminal or a REDCAP terminal. In a contention-based random access process or a non-contention-based random access process, an RAR includes uplink scheduling information used for sending a message 3. The uplink scheduling information includes a 14-bit frequency domain resource allocation field. Frequency domain resource allocation indication is determined based on a joint coding value indicating a start resource location and a length. If an allocable frequency domain bandwidth is M resource units, for example, resource blocks (RBs) or resource elements (RES), $$\frac{M \times (M+1)}{2}$$

States need to be indicated, and $$\log_2 \frac{M \times (M+1)}{2}$$

(e.g., ceiling) pits need to be indicated. According to an existing protocol, if an allocable bandwidth is less than or equal to 180 RBs, the 14-bit frequency domain resource allocation field is truncated to a length of $$\log_2 \frac{M \times (M+1)}{2},$$

and low bits in the 14-bit frequency domain resource allocation field are reserved. However, the frequency domain resource allocation field is always 14 bits.

It can be learned that for a bandwidth-limited REDCAP UE, if frequency domain resource allocation indication is performed according to the existing protocol, there is an idle bit in the frequency domain resource allocation field, resulting in a resource waste.

SUMMARY

This application provides a communication method and apparatus. During frequency domain resource allocation indication, a frequency domain resource allocation field can be prevented from being truncated, frequency domain resources can be used more effectively, and a resource waste can be avoided.

According to a first aspect, this application provides a communication method, where the method is applicable to a first terminal device, and the method includes: receiving first uplink grant information, where the first uplink grant information includes a first field, the first field indicates frequency domain resource allocation information, and a length Y of the first field is less than X, where X is a pre-specified value; or X is a length of a second frequency domain resource allocation field associated with a second uplink grant format, and the first terminal device does not support the second uplink grant format; and Y is related to a quantity N of resource blocks supported or configured by the first terminal device, and N is a positive integer; and determining, by the first terminal device based on the first field, a resource for uplink transmission, and performing uplink transmission based on the resource.

According to the communication method provided in the first aspect, when frequency domain resource allocation indication is performed by using the first uplink grant information, for the first terminal device, a length of a frequency domain resource allocation field is related to the quantity N of resource blocks supported or configured by the first terminal device. To be specific, the length of the frequency domain resource allocation field varies along with the quantity N of resource blocks supported or configured by the first terminal device, and is less than the length of the second frequency domain resource allocation field associated with the second uplink grant format. Therefore, the length of the frequency domain resource allocation field of the first terminal device is allocated as required. In this way, the frequency domain resource allocation field can be prevented from being truncated, frequency domain resources can be used more effectively, and a resource waste can be avoided.

In a possible design, the first terminal device may be a first-type terminal device, the second uplink grant format is used for a second-type terminal device, and the first-type terminal device and the second-type terminal device have different capabilities, versions, or application scenarios.

Optionally, that the first terminal device and the second terminal device have different capabilities may include at least one of the following:

1. The first terminal device and the second terminal device have different bandwidth capabilities.

2. The first terminal device and the second terminal device have different quantities of transceiver antennas.

3. The first terminal device and the second terminal device have different maximum uplink transmit powers.

4. The first terminal device and the second terminal device correspond to different protocol versions.

5. The first terminal device and the second terminal device support different carrier aggregation (CA) capabilities.

6. The first terminal device supports full-duplex frequency division duplex (FDD), and the second terminal device supports only half-duplex FDD.

7. The first terminal device and the second terminal device have different data processing time capabilities.

8. The first terminal device and the second terminal device have different processing capabilities. The processing capabilities include, for example, a supported maximum quantity of retransmission processes, a supported maximum modulation scheme, or a maximum data packet that supports to be transmitted.

9. The first terminal device and the second terminal device correspond to different uplink transmission peak rates and/or different downlink transmission peak rates.

10. The first terminal device and the second terminal device correspond to different services.

In a possible design, the first uplink grant information further includes a second field, the second field indicates at least one of whether to perform frequency hopping and an offset value, and the offset value is an offset value for performing frequency hopping transmission on the resource.

According to the communication method provided in some implementations, the second field and the first field are independent of each other, and the second field is a frequency hopping indicator field. Because the second field and the first field are independent of each other, an idle bit in the frequency domain resource allocation field is avoided, and frequency hopping indication does not cause a decrease in a quantity of frequency domain resource allocable states that can be indicated, so that frequency domain resource allocation is not limited.

In a possible design, the second field can indicate at least one of the following bit states:

a first bit state, indicating not to perform frequency hopping;

a second bit state, indicating to perform frequency hopping and that the offset value is a first offset value; or the second bit state is a reserved state;

a third bit state, indicating to perform frequency hopping and that the offset value is a second offset value; or the third bit state is a reserved state; and a fourth bit state, indicating to perform frequency hopping and that the offset value is a third offset value; or the fourth bit state is a reserved state.

In a possible design, the offset value includes at least one of $$\frac{1}{4}N, \frac{1}{2}N, \text{ and } -\frac{1}{4}N.$$

In a possible design, a correspondence between the at least one bit state and the at least one offset value is predefined, or is configured by using signaling.

In a possible design, the offset value is determined based on a third field and first information, where the third field is included in the first uplink grant information; and the first information is predefined, or the first information is configured by using signaling.

According to the communication method provided in this implementation, the frequency hopping indication does not occupy any bit in the first field, and does not cause a decrease in the quantity of frequency domain resource allocable states that can be indicated, so that frequency domain resource allocation is not limited.

In a possible design, before the receiving first uplink grant information, the method may further include: determining, based on second information, whether to perform frequency hopping, where the second information is predefined, or the second information is configured by using signaling; and when it is determined, based on the second information, to perform frequency hopping, determining an offset value during frequency hopping based on a fourth field, where the fourth field is included in the first uplink grant information.

According to the communication method provided in some implementations, the first terminal device determines, based on the second information, whether to perform frequency hopping. In this way, the first uplink grant information does not need an existing frequency hopping indicator field, 1 bit may be idle, and the third field may indicate the offset value during frequency hopping. For example, the idle bit and one bit in X bits of the frequency domain resource allocation field of the first uplink grant information may indicate the offset value during frequency hopping, the frequency hopping indication does not occupy any bit in the first field, so that the quantity of frequency domain resource allocable states that can be indicated is not reduced, and frequency domain resource allocation is not limited.

In a possible design, when N is within a first value range, whether to perform frequency hopping is determined based on the second information; and when N is within a second value range, whether to perform frequency hopping and/or the offset value during frequency hopping are/is determined based on a fifth field, where the fifth field is included in the first uplink grant information.

According to the communication method provided in this implementation, the fifth field is a field independent of the first field, and the fifth field indicates whether to perform frequency hopping or the offset value during frequency hopping. Similarly, the frequency hopping indication does not occupy any bit in the first field. Therefore, the quantity of frequency domain resource allocable states that can be indicated is not reduced, and frequency domain resource allocation is not limited.

In a possible design, when N is within the first value range, whether to perform frequency hopping is determined by using radio resource control signaling; and when N is within the second value range, whether to perform frequency hopping is determined by using the first uplink grant information.

In a possible design, the first uplink grant information does not include a reserved field and/or a channel state information request field.

According to the communication method provided in some implementations, because the first uplink grant information does not include the reserved field and/or the channel state information request field, the reserved field and/or the channel state information request field and 1 bit in the X bits of the existing frequency domain resource allocation field may indicate whether to perform frequency hopping and the offset value during frequency hopping. The frequency hopping indication does not occupy any bit in the first field. Therefore, the quantity of frequency domain resource allocable states that can be indicated is not reduced, and frequency domain resource allocation is not limited.

In a possible design, each of at least one field included in the first uplink grant information indicates one piece of information, and the piece of information includes any one or more pieces of the following information: information about whether small packet transmission is allowed, small packet transmission information when small packet transmission is allowed, information about a 2-step random access channel (RACH), information about a 4-step RACH, information about whether the first terminal device is allowed to access a network, information about a 5-bit modulation and coding scheme, information about a quantity of repetitions of a scheduled physical uplink shared channel (PUSCH), information about a repetition type of the scheduled PUSCH, reporting capability indication information of the first terminal device, type information of the first terminal device, service type information of the first terminal device, subcarrier spacing information, transport block set (TBS) information, and TBS threshold information.

According to the communication method provided in this implementation, resource utilization of an idle bit can be improved.

In a possible design, the first uplink grant information includes a sixth field, and when a subcarrier spacing used by the resource is u1, at least a length of the sixth field is N1 bits; and when the subcarrier spacing used by the resource is u2, the length of the sixth field is N2 bits, and N1 is not equal to N2.

In a possible design, the method may further include: receiving first indication information; when a value or a bit state of the first indication information belongs to a first set, determining a bandwidth resource of the first terminal device as a first resource; when the value or the bit state of the first indication information belongs to a second set, determining the bandwidth resource of the first terminal device as a second resource, where the first resource and the second resource are not totally the same, or the first resource partially overlaps with the second resource; and determining locations of the N resource blocks and/or a value of N based on the bandwidth resource of the first terminal device.

In a possible design, the locations of the N resource blocks are indicated to the first terminal device by using second indication information, or the locations of the N resource blocks are predefined.

In a possible design, the method may further include: determining the value of N based on a bandwidth that can be supported by the first terminal device.

In a possible design, the method may further include: determining a first value based on a capability of the first terminal device; and determining the value of N based on the bandwidth resource and the first value.

In a possible design, the method may further include: receiving third indication information, where the third indication information includes first initial uplink bandwidth parts (BWP) configuration information; and determining the locations of the N resource blocks and/or the value of N based on the first initial uplink BWP configuration information.

According to a second aspect, this application provides a communication method. The method is applicable to an access network device, and the method includes: determining first uplink grant information, where the first uplink grant information includes a first field, the first field indicates frequency domain resource allocation information, and a length Y of the first field is less than X, where X is a pre-specified value; or X is a length of a second frequency domain resource allocation field associated with a second uplink grant format, and a first terminal device does not support the second uplink grant format; and Y is related to a quantity N of resource blocks supported or configured by the first terminal device, and N is a positive integer; and sending the first uplink grant information to the first terminal device.

According to the communication method provided in the second aspect, the access network device sends the first uplink grant information to the first terminal device. When frequency domain resource allocation indication is performed by using the first uplink grant information, a length of a frequency domain resource allocation field is related to the quantity N of resource blocks supported or configured by the first terminal device. To be specific, the length of the frequency domain resource allocation field may change along with the quantity N of resource blocks supported or configured by the first terminal device, and is less than the length of the second frequency domain resource allocation field associated with the second uplink grant format. Therefore, the length of the frequency domain resource allocation field of the first terminal device is allocated as required. In this way, the frequency domain resource allocation field can be prevented from being truncated, frequency domain resources can be used more effectively, and a resource waste can be avoided.

In a possible design, the first terminal device may be a first-type terminal device, the second uplink grant format is used for a second-type terminal device, and the first-type terminal device and the second-type terminal device have different capabilities.

Optionally, that the first-type terminal device and the second-type terminal device have different capabilities may include at least one of the following:

1. The first-type terminal device and the second-type terminal device have different bandwidth capabilities.

2. The first-type terminal device and the second-type terminal device have different quantities of transceiver antennas.

3. The first-type terminal device and the second-type terminal device have different maximum uplink transmit powers.

4. The first-type terminal device and the second-type terminal device correspond to different protocol versions.

5. The first-type terminal device and the second-type terminal device support different CA capabilities.

6. The first-type terminal device supports full-duplex frequency division duplex (FDD), and the second-type terminal device supports only half-duplex FDD.

7. The first-type terminal device and the second-type terminal device have different data processing time capabilities.

8. The first-type terminal device and the second-type terminal device have different processing capabilities.

9. The first-type terminal device and the second-type terminal device correspond to different uplink transmission peak rates and/or different downlink transmission peak rates.

10. The first-type terminal device and the second-type terminal device correspond to different services.

In a possible design, the first uplink grant information further includes a second field, the second field indicates at least one of whether to perform frequency hopping and an offset value, and the offset value is an offset value for performing frequency hopping transmission on the resource.

According to the communication method provided in some implementations, the second field and the first field are independent of each other, and the second field is a frequency hopping indicator field. Because the second field and the first field are independent of each other, an idle bit in the frequency domain resource allocation field is avoided, and frequency hopping indication does not cause a decrease in a quantity of frequency domain resource allocable states that can be indicated, so that frequency domain resource allocation is not limited.

In a possible design, the second field can indicate at least one of the following bit states:
a first bit state, indicating not to perform frequency hopping;
a second bit state, indicating to perform frequency hopping and that the offset value is a first offset value; or the second bit state is a reserved state;
a third bit state, indicating to perform frequency hopping and that the offset value is a second offset value; or the third bit state is a reserved state; and
a fourth bit state, indicating to perform frequency hopping and that the offset value is a third offset value; or the fourth bit state is a reserved state.

In a possible design, the offset value includes at least one of $$\frac{1}{4}N, \frac{1}{2}N, \text{ and } -\frac{1}{4}N.$$

In a possible design, a correspondence between the at least one bit state and the at least one offset value is predefined, or is configured by using signaling.

In a possible design, the offset value is indicated to the first terminal device by using a third field and first information, where the third field is included in the first uplink grant information; and the first information is predefined, or the first information is configured for the first terminal device by using signaling.

According to the communication method provided in some implementations, the frequency hopping indication does not occupy any bit in the first field, and does not cause a decrease in the quantity of frequency domain resource allocable states that can be indicated, so that frequency domain resource allocation is not limited.

In a possible design, the method may further include: indicating, by using second information, whether to perform frequency hopping, where the second information is predefined, or the second information is configured for the first terminal device by using signaling; and when the second information indicates to perform frequency hopping, indicating an offset value during frequency hopping based on a fourth field, where the fourth field is included in the first uplink grant information.

According to the communication method provided in this implementation, the first terminal device determines, based on the second information, whether to perform frequency hopping. In this way, the first uplink grant information does not need an existing frequency hopping indicator field, 1 bit may be idle, and the third field may indicate the offset value during frequency hopping. For example, the idle bit and one bit in X bits of the frequency domain resource allocation field of the first uplink grant information may indicate the offset value during frequency hopping, and the frequency hopping indication does not occupy any bit in the first field, so that the quantity of frequency domain resource allocable states that can be indicated is not reduced, and frequency domain resource allocation is not limited.

In a possible design, when N is within a first value range, whether to perform frequency hopping is indicated based on the second information; and when N is within a second value range, whether to perform frequency hopping or the offset value during frequency hopping is indicated based on a fifth field, where the fifth field is included in the first uplink grant information.

According to the communication method provided in some implementations, the fifth field is a field independent of the first field, and the fifth field indicates whether to perform frequency hopping or the offset value during frequency hopping. Similarly, the frequency hopping indication does not occupy any bit in the first field. Therefore, the quantity of frequency domain resource allocable states that can be indicated is not reduced, and frequency domain resource allocation is not limited.

In a possible design, when N is within the first value range, whether to perform frequency hopping is indicated by using radio resource control signaling; and when N is within the second value range, whether to perform frequency hopping is indicated by using the first uplink grant information.

In a possible design, the first uplink grant information does not include a reserved field and/or a channel state information request field.

According to the communication method provided in some implementations, because the first uplink grant information does not include the reserved field and/or the channel state information request field, the reserved field and/or the channel state information request field and 1 bit in the X bits of the existing frequency domain resource allocation field may indicate whether to perform frequency hopping and the offset value during frequency hopping. The frequency hopping indication does not occupy any bit in the first field. Therefore, the quantity of frequency domain resource allocable states that can be indicated is not reduced, and frequency domain resource allocation is not limited.

In a possible design, each of at least one field included in the first uplink grant information indicates one piece of information, and the piece of information includes any one or more pieces of the following information: information about whether small packet transmission is allowed, small packet transmission information when small packet transmission is allowed, information about a 2-step RACH, information about a 4-step RACH, information about whether the first terminal device is allowed to access a network, information about a 5-bit modulation and coding scheme, information about a quantity of repetitions of a scheduled PUSCH, information about a repetition type of the scheduled PUSCH, reporting capability indication information of the first terminal device, type information of the first terminal device, service type information of the first terminal device, subcarrier spacing information, TBS information, and TBS threshold information.

According to the communication method provided in some implementations, resource utilization of an idle bit can be improved.

In a possible design, the first uplink grant information includes a sixth field, and when a subcarrier spacing used by the resource is u1, a length of the sixth field is N1 bits; and when the subcarrier spacing used by the resource is u2, the length of the sixth field is N2 bits, and N1 is not equal to N2.

In a possible design, the method may further include: sending first indication information to the first terminal device, where when a value or a bit state of the first indication information belongs to a first set, the first indication information indicates that a bandwidth resource of the first terminal device is a first resource; and when the value or the bit state of the first indication information belongs to a second set, the first indication information indicates that the bandwidth resource of the first terminal device is a second resource, where the first resource is different from the second resource, or the first resource partially overlaps with the second resource.

In a possible design, the method may further include: determining a value of N based on a bandwidth that can be supported by the first terminal device.

In a possible design, the method may further include: determining a first value based on a capability of the first terminal device; and determining a value of N based on the bandwidth resource and the first value.

In a possible design, locations of the N resource blocks are indicated by using second indication information, or locations of the N resource blocks are predefined.

In a possible design, the value of N and/or the locations of the N resource blocks are/is indicated by using third indication information, where the third indication information includes first initial uplink BWP configuration information.

According to a third aspect, this application provides a communication apparatus, where the apparatus includes: a receiving module, configured to receive first uplink grant information, where the first uplink grant information includes a first field, the first field indicates frequency domain resource allocation information, and a length Y of the first field is less than X, where X is a pre-specified value; or X is a length of a second frequency domain resource allocation field associated with a second uplink grant format, and the communication apparatus does not support the second uplink grant format; and Y is related to a quantity N of resource blocks supported or configured by the communication apparatus, and N is a positive integer; a determining module, configured to determine a resource for uplink transmission based on the first field; and a sending module, configured to perform uplink transmission on the resource.

In a possible design, the first uplink grant information further includes a second field, the second field indicates at least one of whether to perform frequency hopping and an offset value, and the offset value is an offset value for performing frequency hopping transmission on the resource.

In a possible design, the second field can indicate at least one of the following bit states:

a first bit state, indicating not to perform frequency hopping;
a second bit state, indicating to perform frequency hopping and that the offset value is a first offset value; or the second bit state is a reserved state;
a third bit state, indicating to perform frequency hopping and that the offset value is a second offset value; or the third bit state is a reserved state; and
a fourth bit state, indicating to perform frequency hopping and that the offset value is a third offset value; or the fourth bit state is a reserved state.

In a possible design, the offset value includes at least one of $$\frac{1}{4}N, \frac{1}{2}N, \text{ and } -\frac{1}{4}N.$$

In a possible design, a correspondence between the at least one bit state and the at least one offset value is predefined, or is configured by using signaling.

In a possible design, the offset value is determined based on a third field and first information, where the third field is included in the first uplink grant information; and the first information is predefined, or the first information is configured by using signaling.

In a possible design, the determining module is further configured to: before the receiving module receives the first uplink grant information, determine, based on second information, whether to perform frequency hopping, where the second information is predefined, or the second information is configured by using signaling; and when it is determined, based on the second information, to perform frequency hopping, determine an offset value during frequency hopping based on a fourth field, where the fourth field is included in the first uplink grant information.

In a possible design, the determining module is configured to: when N is within a first value range, determine, based on the second information, whether to perform frequency hopping; and when N is within a second value range, determine, based on a fifth field, whether to perform frequency hopping and/or the offset value during frequency hopping, where the fifth field is included in the first uplink grant information; and/or when N is within the first value range, configure, by using radio resource control signaling, whether to perform frequency hopping; and when N is within the second value range, indicate, by using the first uplink grant information, whether to perform frequency hopping.

In a possible design, the first uplink grant information does not include a reserved field and/or a channel state report channel state information request field.

In a possible design, each of at least one field included in the first uplink grant information indicates one piece of information, and the piece of information includes any one or more pieces of the following information: information about whether small packet transmission is allowed, small packet transmission information when small packet transmission is allowed, information about a 2-step RACH, information about a 4-step RACH, information about whether the first terminal device is allowed to access a network, information about a 5-bit modulation and coding scheme, information about a quantity of repetitions of a scheduled PUSCH, information about a repetition type of the scheduled PUSCH, reporting capability indication information of the first terminal device, type information of the first terminal device, service type information of the first terminal device, subcarrier spacing information, TBS information, and TBS threshold information.

In a possible design, the first uplink grant information includes a sixth field, and when a subcarrier spacing used by the resource is u1, a length of the sixth field is N1 bits; and when the subcarrier spacing used by the resource is u2, a sum of the sixth field is N2 bits, and N1 is not equal to N2.

In a possible design, the receiving module is further configured to receive first indication information; the determining module is further configured to: when a value or a bit state of the first indication information belongs to a first set, determine a bandwidth resource of the first terminal device as a first resource; and when the value or the bit state of the first indication information belongs to a second set, determine the bandwidth resource of the first terminal device as a second resource, where the first resource and the second resource are not totally the same, or the first resource partially overlaps with the second resource; and the determining module is further configured to determine locations of the N resource blocks and/or a value of N based on the bandwidth resource of the first terminal device.

In a possible design, the locations of the N resource blocks are indicated to the first terminal device by using second indication information, or the locations of the N resource blocks are predefined.

In a possible design, the determining module is further configured to: determine the value of N based on a bandwidth that can be supported by the first terminal device; or determine a first value based on a capability of the first terminal device; and determine the value of N based on the bandwidth resource and the first value.

In a possible design, the receiving module is further configured to receive third indication information, where the third indication information includes first initial uplink BWP configuration information; and the determining module is further configured to determine the locations of the N resource blocks and/or the value of N based on the first initial uplink BWP configuration information.

For beneficial effects of the apparatus provided in the third aspect and the possible designs of the third aspect, refer to the beneficial effects brought by the first aspect and the possible implementations of the first aspect. Details are not described herein again.

According to a fourth aspect, this application provides a communication apparatus, including: a determining module, configured to determine first uplink grant information, where the first uplink grant information includes a first field, the first field indicates frequency domain resource allocation information, and a length Y of the first field is less than X, where X is a pre-specified value; or X is a length of a second frequency domain resource allocation field associated with a second uplink grant format, and a first terminal device communicating with the communication apparatus does not support the second uplink grant format; and Y is related to a quantity N of resource blocks supported or configured by the first terminal device, and N is a positive integer; and a sending module, configured to send the first uplink grant information to the first terminal device.

In a possible design, the first uplink grant information further includes a second field, the second field indicates at least one of whether to perform frequency hopping and an offset value, and the offset value is an offset value for performing frequency hopping transmission on the resource.

In a possible design, the second field can indicate at least one of the following bit states:

a first bit state, indicating not to perform frequency hopping;
a second bit state, indicating to perform frequency hopping and that the offset value is a first offset value; or the second bit state is a reserved state;
a third bit state, indicating to perform frequency hopping and that the offset value is a second offset value; or the third bit state is a reserved state; and
a fourth bit state, indicating to perform frequency hopping and that the offset value is a third offset value; or the fourth bit state is a reserved state.

In a possible design, the offset value includes at least one of $$\frac{1}{4}N, \frac{1}{2}N, \text{ and } -\frac{1}{4}N.$$

In a possible design, a correspondence between the at least one bit state and the at least one offset value is predefined, or is configured by using signaling.

In a possible design, the offset value is indicated to the first terminal device by using a third field and first information, where the third field is included in the first uplink grant information; and the first information is predefined, or the first information is configured for the first terminal device by using signaling.

In a possible design, the communication apparatus further includes: a processing module, configured to indicate, by using second information, whether to perform frequency hopping, where the second information is predefined, or the second information is configured for the first terminal device by using signaling; and when the second information indicates to perform frequency hopping, indicate an offset value during frequency hopping based on a fourth field, where the fourth field is included in the first uplink grant information.

In a possible design, the processing module is configured to: when N is within a first value range, indicate, based on the second information, whether to perform frequency hopping; and when N is within a second value range, indicate, based on a fifth field, whether to perform frequency hopping or the offset value during frequency hopping, where the fifth field is included in the first uplink grant information.

In a possible design, the processing module is configured to: when N is within the first value range, indicate, by using radio resource control signaling, whether to perform frequency hopping; and when N is within the second value range, indicate, by using the first uplink grant information, whether to perform frequency hopping.

In a possible design, the first uplink grant information does not include a reserved field and/or a channel state information request field.

In a possible design, each of at least one field included in the first uplink grant information indicates one piece of information, and the piece of information includes any one or more pieces of the following information: information about whether small packet transmission is allowed, small packet transmission information when small packet transmission is allowed, information about a 2-step RACH, information about a 4-step RACH, information about whether the first terminal device is allowed to access a network, information about a 5-bit modulation and coding scheme, information about a quantity of repetitions of a scheduled PUSCH, information about a repetition type of the scheduled PUSCH, reporting capability indication information of the first terminal device, type information of the first terminal device, service type information of the first terminal device, subcarrier spacing information, TBS information, and TBS threshold information.

In a possible design, the first uplink grant information includes a sixth field, and when a subcarrier spacing used by the resource is u1, a length of the sixth field is N1 bits; and when the subcarrier spacing used by the resource is u2, the length of the sixth field is N2 bits, and N1 is not equal to N2.

In a possible design, the sending module is further configured to send first indication information to the first terminal device, where when a value or a bit state of the first indication information belongs to a first set, the first indication information indicates that a bandwidth resource of the first terminal device is a first resource; and when the value or the bit state of the first indication information belongs to a second set, the first indication information indicates that the bandwidth resource of the first terminal device is a second resource, where the first resource is different from the second resource, or the first resource partially overlaps with the second resource.

In a possible design, the determining module is further configured to: determine a value of N based on a bandwidth that can be supported by the first terminal device.

In a possible design, the determining module is further configured to: determine a first value based on a capability of the first terminal device; and determine a value of N based on a bandwidth and the first value.

In a possible design, locations of the N resource blocks are indicated by using second indication information, or locations of the N resource blocks are predefined.

In a possible design, the value of N and/or the locations of the N resource blocks are/is indicated by using third indication information, where the third indication information includes first initial uplink BWP configuration information.

For beneficial effects of the communication apparatus provided in the fourth aspect and the possible designs of the fourth aspect, refer to the beneficial effects brought by the second aspect and the possible implementations of the second aspect. Details are not described herein again.

According to a fifth aspect, this application provides a communication apparatus, including a processor and a communication interface, where the processor is configured to execute executable instructions to perform the communication method in any one of the first aspect and the possible designs of the first aspect or in any one of the second aspect and the possible designs of the second aspect.

According to a sixth aspect, this application provides a computer-readable storage medium. The computer-readable storage medium stores executable instructions. When at least one processor of a communication apparatus executes the executable instructions, the communication apparatus performs the communication method in any one of the first aspect and the possible designs of the first aspect or in any one of the second aspect and the possible designs of the second aspect.

According to a seventh aspect, this application provides a computer program product. The computer program product includes executable instructions, and the executable instructions are stored in a readable storage medium. At least one processor of a communication apparatus may read the executable instructions from the readable storage medium, and the at least one processor executes the executable instructions, so that the communication apparatus implements the communication method in any one of the first aspect and the possible designs of the first aspect or in any one of the second aspect and the possible designs of the second aspect.

According to an eighth aspect, this application provides a communication system, including the communication apparatus in any one of the third aspect and the possible designs of the third aspect and the communication apparatus in any one of the fourth aspect and the possible designs of the fourth aspect.

DESCRIPTION OF EMBODIMENTS

In embodiments of this application, words such as "example" or "for example" are used for indicating examples, instances, or descriptions. Any embodiment or solution described as "example" or "for example" in the embodiments of this application is not to be construed as being more preferred or having more advantages than another embodiment or solution. Exactly, use of the word "example" or "for example" or the like is intended to present a related concept in a specific manner.

In the embodiments of this application, "at least one" means one or more, and "a plurality of" means two or more than two. "And/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between associated objects.

The embodiments of this application may be applied to a wireless communication system. It should be noted that the wireless communication system mentioned in the embodiments of this application includes but is not limited to: a narrowband Internet of things (NB-IoT) system, a global system for mobile communications (GSM), an enhanced data rate for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, and three major application scenarios of a 5G wireless communication system, that is, eMBB, ultra-reliable low-latency communication (URLLC), and massive machine type communications (mMTC).

Figure 1:
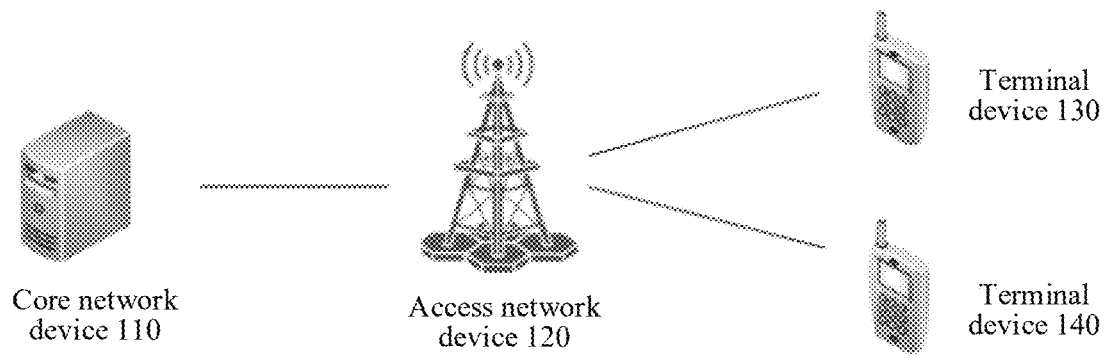
FIG. 1 is a schematic diagram of an architecture of a wireless communication system to which an embodiment of this application is applied.

FIG. 1 is a schematic diagram of an architecture of a wireless communication system to which an embodiment of this application is applied. As shown in FIG. 1, the wireless communication system includes a core network device 110, an access network device 120, and at least one terminal device (for example, a terminal device 130 and a terminal device 140 shown in FIG. 1). The terminal device is connected to the access network device 120 in a wireless manner, and the access network device 120 is connected to the core network device 110 in a wired or wireless manner. The core network device 110 and the access network device 120 may be independent and different physical devices, functions of the core network device 110 and logical functions of the access network device 120 may be integrated into a same physical device, or some functions of the core network device and some functions of the access network device may be integrated into a physical device. The terminal device may be located at a fixed location, or may be mobile. FIG. 1 is only a schematic diagram. The wireless communication system may further include another network device, for example, may further include a wireless relay device and a wireless backhaul device, which are not shown in FIG. 1. Quantities of core network devices, access network devices, and terminal devices included in the wireless communication system are not limited in the embodiments of this application.

The access network device is an access device used by the terminal device to access the wireless communication system in a wireless manner, and may be a device configured to communicate with the terminal device. For example, the access network device may be a base transceiver station (BTS) in a GSM system or a CDMA system, or may be a NodeB (NB) in a WCDMA system, or may be an evolved NodeB (eNB or eNodeB) in an LTE system, or may be a next generation eNodeB (ng-eNB) in an LTE system. Alternatively, the access network device may be a relay station, an access point (AP), a vehicle-mounted device, a wearable device, a network side device in a 5G network, or an access network device in a future evolved public land mobile network (PLMN), for example, may be a next-generation NodeB (gNB or gNodeB). A specific technology and a specific device form used by the access network device are not limited in the embodiments of this application.

The terminal device in some embodiments of this application may be a wireless terminal. The wireless terminal may refer to a device that provides a user with only voice and/or other service data connectivity, a handheld device with a wireless connection function, or another processing device connected to a wireless modem. The wireless terminal may communicate with one or more core networks through a radio access network (RAN). The wireless terminal may be a mobile terminal, for example, a mobile phone (which is also referred to as a "cellular" phone) or a computer having a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless phone, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, or user equipment (e.g., user device, UE), which is not limited herein.

The access network device and the terminal device may be deployed on land, where the deployment includes indoor or outdoor, handheld, or vehicle-mounted deployment; or may be deployed on water; or may be deployed on a plane, a balloon, and a satellite in air. Application scenarios of the access network device and the terminal device are not limited in the embodiments of this application.

The embodiments of this application may be applied to downlink signal transmission, uplink signal transmission, or device to device (D2D) signal transmission. For the downlink signal transmission, a sending device is an access network device, and a corresponding receiving device is a terminal device. For the uplink signal transmission, a sending device is a terminal device, and a corresponding receiving device is an access network device. For the D2D signal transmission, a sending device is a terminal device, and a corresponding receiving device is also a terminal device. A signal transmission direction is not limited in the embodiments of this application.

Communication between an access network device and a terminal device and communication between terminal devices may be performed by using a licensed spectrum, an unlicensed spectrum, or both a licensed spectrum and an unlicensed spectrum. The communication between the access network device and the terminal device and the communication between the terminal devices may be performed by using a spectrum below 6 GHz, a spectrum above 6 GHz, or both a spectrum below 6 GHz and a spectrum above 6 GHz. Spectrum resources used between the access network device and the terminal device are not limited in the embodiments of this application.

In an existing new radio (NR) system, a frequency domain resource allocation field in uplink grant information of a random access response is fixed at 14 bits. A terminal device in an mMTC scenario may be a reduced capability terminal device. The reduced capability terminal device may also be referred to as a light terminal device. For example, a reduced capability (REDCAP) terminal device in the NR system has a lower capability than a conventional terminal device. For example, compared with the conventional terminal device, the REDCAP terminal device has one or more of the following features: supporting a narrower bandwidth, having fewer configured antennas, supporting a smaller maximum transmit power, and supporting a lower duplex capability (for example, a reduced capability terminal device that is being discussed). For the reduced capability terminal device, according to a stipulation in an existing protocol, the 14-bit frequency domain resource allocation field in the uplink grant information of the random access response is truncated to a length of $$\log_2 \frac{M \times (M+1)}{2}.$$

MV is a quantity of resource blocks (RBs) included in a BWP configured by an access network device for the terminal device or a quantity of resource blocks used for an allocable frequency domain resource bandwidth. When frequency domain resource allocation indication is performed according to the stipulation in the existing protocol, bits in the frequency domain resource allocation field may not be fully used, and the resource allocation field may not indicate resource allocation of some lengths, leading to problems of inflexible resource indication and ineffective resource utilization. To resolve the problems, this application provides a communication method and apparatus. During frequency domain resource allocation indication, for a first terminal device, a length of a frequency domain resource allocation field is related to a quantity N of resource blocks supported or configured by the first terminal device. For example, the first terminal device is a reduced capability terminal device. In this application, the length of the frequency domain resource allocation field is related to the quantity N of resource blocks supported or configured by the first terminal device. For example, a frequency domain resource allocation field of uplink grant information in a random access response sent to the first terminal device is less than 14 bits. For another example, a frequency domain resource allocation field of uplink grant information for scheduling a physical uplink shared channel of the first terminal device is less than 14 bits. Therefore, a field for allocating a frequency domain resource to the first terminal device can be used to flexibly allocate resource blocks. Therefore, frequency domain resources can be used more effectively, a resource waste can be avoided, and resource allocation flexibility can be improved.

The following describes the communication method and apparatus provided in this application in detail with reference to the accompanying drawings.

Figure 2:
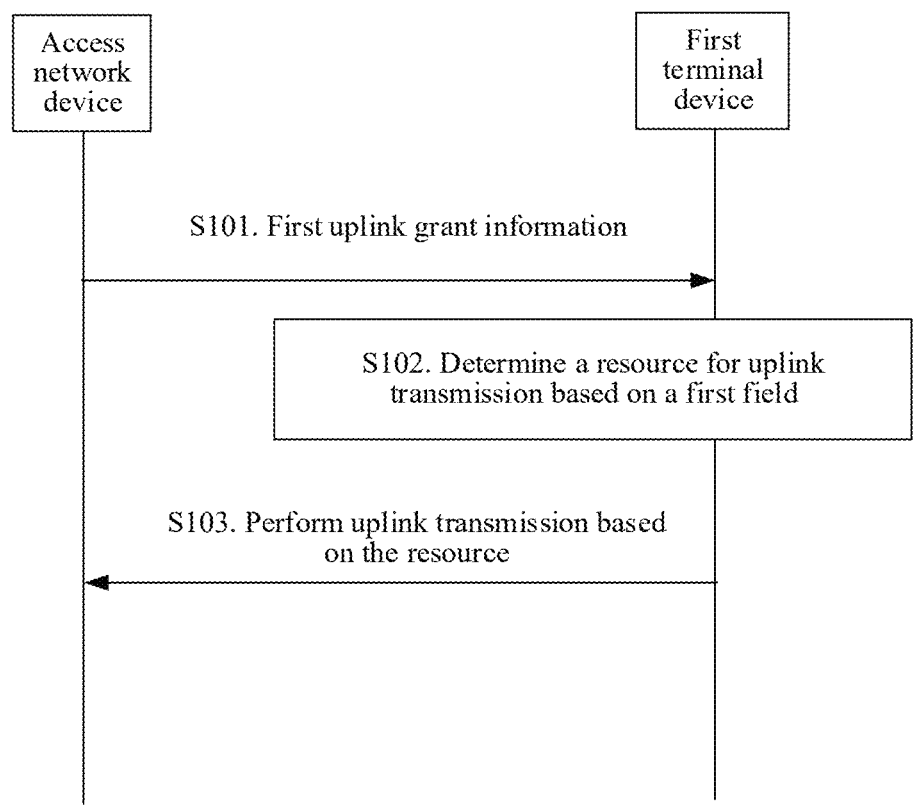
FIG. 2 is an interaction flowchart of an embodiment of a communication method according to this application.

FIG. 2 is an interaction flowchart of an embodiment of a communication method according to this application. The method in some embodiments is applicable to a first terminal device. The first terminal device may be a first-type terminal device. In the following context, the first terminal device and the first-type terminal device have a same meaning, and are interchangeable. For example, the first terminal device may be a terminal device whose bandwidth is less than or equal to 20 MHz (or 10 MHz, 5 MHZ, 3 MHz, 1.4 MHZ, or 200 kHz). The bandwidth may be a channel bandwidth, may be a maximum bandwidth supported by the terminal device, or may be a size of a BWP configured by an access network device for the terminal device. For another example, the first terminal device may be a terminal device whose quantity of resource blocks included in the bandwidth is less than 106 RBs (or 100 RBs, 50 RBs, 25 RBs, 15 RBs, 6 RBs, or 1 RB). As shown in FIG. 2, the method according to some embodiments may include the following steps.

S101. The access network device sends first uplink grant information to the first terminal device. Correspondingly, the first terminal device receives the first uplink grant information from the access network device.

The access network device may send different uplink grant information to different types of terminal devices. For example, the access network device may further send second uplink grant information to a second terminal device. The second terminal device may be a second-type terminal device. Alternatively, a type of the second terminal device may be the same as that of the first terminal device. A bandwidth of the second terminal device is different from the bandwidth of the first terminal device. For example, the bandwidth of the second terminal device may be greater than the bandwidth of the first terminal device. For example, the bandwidth of the second terminal device is 100 MHz or 50 MHz. The first terminal device and the second terminal device may use different random access resources. The access network device may learn a type of a terminal device by receiving a random access channel, and then the access network device sends, to the terminal device based on the type of the terminal device, uplink grant information corresponding to the terminal device. For example, if the access network device determines that the terminal device is the first-type terminal device, the access network device sends the first uplink grant information to the first-type terminal device; and if the access network device determines that the terminal device is the second-type terminal device, the access network device sends the second uplink grant information to the second terminal device. A format of the first uplink grant information is different from a format of the second uplink grant information. A format of uplink grant information specifies at least one of one or more fields included in the uplink grant information, a size of each field, a location of each field in the grant information, or an order of a plurality of fields in the grant information. If content included in uplink grant information specified in one uplink grant information format is different from content included in uplink grant information specified in another different uplink grant information format, it is considered that the two grant information formats are different. The content herein may be at least one of a field, content of the field, a size of the field, a location of the field in the grant information, or an order of the field in the grant information.

In some embodiments, the format of the first uplink grant information is referred to as a first uplink grant format. The format of the second uplink grant information is referred to as a second uplink grant format, and the second uplink grant information is also referred to as grant information associated with the second uplink grant format. For example, a second frequency domain resource allocation field associated with the second uplink grant format indicates frequency domain resource allocation information of the second-type terminal device. A length of the second frequency domain resource allocation field is X bits. In an implementation, X is a fixed value. In another implementation, X is 14.

In some embodiments, X may be a predefined value. For example, in an implementation (for example, for uplink grant information included in a random access response), X is a fixed value. For example, X=14. For example, in another implementation (for example, uplink grant information or downlink grant information included in downlink control information), $$X = 1 + \left\lceil \log_2 \frac{N \times (N+1)}{2} \right\rceil, \text{ and}$$

$$Y = \left\lceil \log_2 \frac{N \times (N+1)}{2} \right\rceil.$$

N is a positive integer related to resource allocation. For example, N is a quantity of resource blocks configured by the access network device for the first terminal device.

For how the access network device determines the type of the terminal device, in an implementation, for example, in a non-contention-based random access scenario, because a dedicated random access resource and preamble sequence are used for non-contention-based random access, the access network device may determine the type of the terminal device before sending a random access response to the terminal device. For example, it may be determined that the terminal device is an eMBB terminal or a REDCAP terminal. For another example, in a contention-based random access scenario, if the access network device can distinguish, when sending a random access response message, whether a terminal device that initiates random access is the first-type terminal device or the second-type terminal device, the access network device may send uplink grant information corresponding to the terminal device to different types of terminal devices. A method for distinguishing between different types of terminal devices by the access network device may be configuring different access resources for different types of terminal devices. The access resource may be one or more of a frequency domain, a time domain, a code domain, and a sequence. The access resource is not limited in this embodiment.

It may be understood that, in another scenario, the access network device may alternatively determine the type of the terminal device in another manner, and the access network device may send corresponding uplink grant information to the terminal device of the type based on the type of the terminal device. This is not limited in this embodiment.

In some embodiments, capabilities of the first-type terminal device and the second-type terminal device are different. This may be reflected in at least one of the following:

1. The first-type terminal device and the second-type terminal device have different bandwidth capabilities. For example, the second-type terminal device may support data transmission with the access network device by using a maximum of 100 MHz frequency resource on one carrier at a time, and the first-type terminal device may support data transmission with the access network device by using a maximum of 20 MHz frequency resource, a 10 MHz frequency resource, or a 5 MHz frequency resource on one carrier at a time.

2. The first-type terminal device and the second-type terminal device have different quantities of transceiver antennas. For example, a minimum antenna configuration supported by the second-type terminal device is 4 transmit antennas and 2 receive antennas. To be specific, in the minimum antenna configuration, 4 receive antennas are used to receive downlink data, and 2 transmit antennas are used to send uplink data. A maximum antenna configuration supported by the first-type terminal device is lower than 4 transmit antennas and 2 receive antennas. For example, the second-type terminal device supports only 2 receive antennas and 1 transmit antenna, or may support 2 receive antennas and 2 transmit antennas, or 1 receive antenna and 1 transmit antenna.

3. The first-type terminal device and the second-type terminal device have different maximum uplink transmit powers. For example, the maximum uplink transmit power of the second-type terminal device may be 23 dBm or 26 dBm, and the maximum uplink transmit power of the first-type terminal device may fall within a range of 4 dBm to 20 dBm.

4. The first-type terminal device and the second-type terminal device correspond to different protocol versions. For example, NR Rel-15 and NR Rel-16 terminal devices may be second-type terminal devices, and NR Rel-17 terminal devices may be first-type terminal devices.

5. The first-type terminal device and the second-type terminal device support different CA capabilities. For example, the second-type terminal device may support carrier aggregation, but the first-type terminal device does not support carrier aggregation. For another example, both the first-type terminal device and the second-type terminal device support carrier aggregation, but a maximum quantity of carriers that are simultaneously supported for aggregation by the second-type terminal device is greater than a maximum quantity of carriers that are simultaneously supported for aggregation by the first-type terminal device. For example, the second-type terminal device may support aggregation of a maximum of 5 carriers or 32 carriers simultaneously, and the first-type terminal device supports aggregation of a maximum of 2 carriers simultaneously.

6. The second-type terminal device supports full-duplex FDD, and the second-type terminal device supports only half-duplex FDD.

7. The first-type terminal device and the second-type terminal device have different data processing time capabilities. For example, a minimum delay between a time point at which the second-type terminal device receives downlink data and a time point at which the second-type terminal device sends a feedback for the downlink data is less than a minimum delay between a time point at which the first-type terminal device receives downlink data and a time point at which the first-type terminal device sends a feedback for the downlink data, and/or a minimum delay between a time point at which the second-type terminal device sends uplink data and a time point at which the second-type terminal device receives a feedback for the uplink data is less than a minimum delay between a time point at which the first-type terminal device sends uplink data and a time point at which the first-type terminal device receives a feedback for the uplink data.

8. The first-type terminal device and the second-type terminal device have different processing capabilities. For example, the first-type terminal device has a lower processing capability, for example, does not support 256 quadrature amplitude modulation (QAM); and/or a maximum quantity of hybrid automatic repeat requests (HARQs) supported by the first-type terminal device is 8, and a maximum quantity of HARQs supported by the second-type terminal device is 16.

9. The first-type terminal device and the second-type terminal device correspond to different uplink transmission peak rates and/or different downlink transmission peak rates.

10. The first-type terminal device and the second-type terminal device correspond to different services. For example, a service corresponding to the first-type terminal device is an Internet of Things application (for example, video surveillance), and a service corresponding to the second-type terminal device is mobile broadband (MBB).

Optionally, the first-type terminal device may be, for example, a REDCAP terminal device, and the second-type terminal device may be, for example, an NR legacy terminal device.

The first uplink grant information includes a first field, and the first field indicates frequency domain resource allocation information, and a length Y of the first field is less than X. X is a pre-fixed value, for example, X=14. Alternatively, X is the length of the second frequency domain resource allocation field associated with the second uplink grant format. The first terminal device does not support the second uplink grant format. Y is related to a quantity N of resource blocks supported or configured by the first terminal device, and N is a positive integer. For example, that the first terminal device does not support the second uplink grant format means that the first terminal device cannot obtain uplink grant information based on the second uplink grant format. The length of the second frequency domain resource allocation field associated with the second uplink grant format may be considered as a length corresponding to the second frequency domain resource allocation field in the second uplink grant format or a quantity of bits occupied by the second frequency domain resource allocation field in the second uplink grant format.

Y is related to the quantity N of resource blocks supported or configured by the first terminal device. In some implementations, Y may be equal to $$\left\lceil \log_2 \frac{N \times (N+1)}{2} \right\rceil.$$

N is the quantity of resource blocks supported or configured by the first terminal device, and $\lceil \ \rceil$ is ceiling. Optionally, N may be pre-specified. Alternatively, N may be the quantity of resource blocks configured by the access network device for the first terminal device. For example, N is a maximum quantity of resource blocks that are configured by the access network device for the terminal device and that are used for information transmission. For example, N is a quantity of resource blocks included in a BWP configured by the access network device, or N is a quantity of resource blocks included in a carrier configured by the access network device. The BWP may be an initial BWP or a non-initial BWP. Alternatively, N may be a quantity of resource blocks supported by the first terminal device. For example, the first terminal device determines the quantity of supported resource blocks based on the bandwidth of the first terminal device. The quantity of resource blocks used for the supported bandwidth may be a maximum quantity of frequency domain resource blocks that can be occupied when the first terminal device performs sending and/or receiving. For example, when the supported bandwidth is 20 MHz, and a subcarrier spacing is 15 kHz, the quantity of supported resource blocks is 106 RBs. For example, the supported bandwidth may be a maximum bandwidth on which the first terminal device can receive a signal, and/or a maximum bandwidth on which the first terminal device can send a signal. It should be noted that, in this application, a resource block is used as an example for description. Generally, one resource block occupies 12 subcarriers in frequency domain. In this application, the resource block may alternatively be a resource unit of another granularity. Alternatively, the resource block may be one of a resource element (RE), a resource element group (REG), a subcarrier, a control channel element, a subframe, a radio frame, a slot, an RB group, a REG bundle, a control channel element (CCE), or a symbol. The access network device may determine N based on the bandwidth supported by the first terminal device. Alternatively, the access network device may configure N for the first terminal device.

In the current technology, a frequency domain resource allocation field in uplink grant information of a random access response is fixed at 14 bits. That is, X=14. For example, in the current technology, when resource block indication is performed for a terminal device, truncated $$\log_2 \frac{M \times (M+1)}{2}$$

bits in the 14 bits are used to perform resource block indication. Therefore, there are $$14 - \log_2 \frac{M \times (M+1)}{2}$$

idle bits. In addition, when frequency hopping indication (also referred to as enabling frequency hopping) is performed in the uplink grant information of the random access response, 1 bit or 2 bits in $$\log_2 \frac{M \times (M+1)}{2}$$

still indicates or indicate an offset value during frequency hopping. Therefore, fewer bits in the $$\log_2 \frac{M \times (M+1)}{2}$$

bits indicate resource block allocation, and resource block allocation is limited (for example, resource allocation of some lengths and/or some start points cannot be indicated). M is a quantity of resource blocks included in the BWP configured by an access network device for the terminal device or a quantity of resource blocks used for an allocable frequency domain resource bandwidth.

In some applications, the access network device uses $$Y = \left\lceil \log_2 \frac{N \times (N+1)}{2} \right\rceil$$

grant information of the random access response to indicate frequency domain resource block allocation bits to the first terminal device. In some embodiments, no bit in the Y bits indicates the offset value during frequency hopping. Therefore, all the Y bits may be used for resource block indication, so that more flexible resource allocation can be provided (for example, a limitation on a length indication or a start point indication of resource block allocation is avoided).

In this application, the access network device may also use $$Y = \left\lceil \log_2 \frac{N \times (N+1)}{2} \right\rceil$$

bits in uplink grant information for scheduling a specific PUSCH of the terminal device indicate frequency domain resource block allocation bits to the first terminal device. No bit in the Y bits indicates the offset value during frequency hopping. Therefore, all the Y bits may be used for resource block indication, so that more flexible resource allocation can be provided (for example, a limitation on a length indication or a start point indication of resource block allocation is avoided).

In some embodiments, optionally, the first uplink grant information may be any one of grant information included in random access response information or downlink control information, or uplink grant information in downlink control information. When the first uplink grant information is included in the downlink control information, the downlink control information may be rollback mode downlink control information. The rollback mode downlink control information may be, for example, a DCI format 0_0. The rollback mode downlink control information may alternatively be, for example, a DCI format 0_0 scrambled by using a TC-RNTI. Alternatively, the downlink control information may be non-rollback mode downlink control information.

The non-rollback mode downlink control information may be, for example, a DCI format 0_1.

In some embodiments, optionally, the second uplink grant information may be any one of grant information included in random access response information (RAR) or downlink control information (DCI), or uplink grant information in DCI. When the second uplink grant information is included in the downlink control information, and when the second uplink grant information is included in the downlink control information, the downlink control information may be rollback mode downlink control information. The rollback mode downlink control information may be, for example, a DCI format 0_0. The rollback mode downlink control information may alternatively be, for example, a DCI format 0_0 scrambled by using a TC-RNTI. Alternatively, the downlink control information may be non-rollback mode downlink control information. The non-rollback mode downlink control information may be, for example, a DCI format 0_1.

S102. The first terminal device receives the first uplink grant information from the access network device, where the first uplink grant information includes the first field. Further, the first terminal device determines a resource for uplink transmission based on the first field. The resource is a frequency domain resource allocated by the access network device to the first terminal device by using the first field. The frequency domain resource may be any one of one or more RBs, resource elements (REs), resource element groups (REGs), resource element group bundles (REG bundles), subcarriers, carriers, or BWPs.

The first uplink grant information includes the first field, and the first field indicates the frequency domain resource allocation information. The first terminal device may determine, based on the frequency domain resource allocation information indicated by the first field, the frequency domain resource to be allocated to the first terminal device, where the frequency domain resource is used for performing uplink transmission.

S103. The first terminal device performs uplink transmission based on the resource.

The first terminal device determines the resource for uplink transmission based on the frequency domain resource allocation information indicated by the first field, and performs uplink transmission based on the determined resource. In some embodiments, uplink transmission may be performed with the access network device on the determined resource. In another scenario, uplink transmission, that is, D2D signal transmission, may be performed with another terminal device on the determined resource, where a sending device is a terminal device, and a corresponding receiving device is also a terminal device. In this scenario, the first terminal device receives the uplink grant information from the terminal device.

Further, as described above, there may be $$14 - \log_2 \frac{M \times (M+1)}{2}$$

idle bits in uplink grant information of a random access response. The access network device sends the uplink grant information to the first terminal device by using a random access response. In the uplink grant information, a quantity of bits indicating frequency domain allocation may be less than 14 bits. Therefore, the idle bits in the uplink grant information may further be used for another indication. In some embodiments, the uplink grant information (for example, uplink grant information for scheduling a PUSCH, or uplink grant information included in a random access response, or a random access response) may include one or more fields, where the one or more fields may indicate at least one piece of information. The piece of information includes any one or more pieces of the following information: information about whether small packet transmission is allowed, small packet transmission information when small packet transmission is allowed, information about a 2-step RACH, information about a 4-step RACH, information about whether the first terminal device is allowed to access a network, information about a 5-bit modulation and coding scheme (MCS), information about a quantity of repetitions of a scheduled, PUSCH, information about a repetition type of the scheduled PUSCH, reporting capability indication information of the first terminal device, type information of the first terminal device, service type information of the first terminal device, subcarrier spacing information, TBS information, and TBS threshold information.

For example, the uplink grant information indicates the terminal device to access a network by using a 4-step RACH. For another example, the uplink grant information indicates to use a 2-step RACH, or indicates the terminal device using the 2-step RACH to roll back to the 4-step RACH to perform random access.

In an existing protocol, an MCS included in uplink grant information in a random access response is 4 bits. Therefore, at most 16 MCS indexes can be indicated. In this embodiment, a quantity of bits of an MCS indicator field is 5 bits, and at most 32 MCS indexes may be performed.

In some implementations, the first uplink grant information sent by the access network device to the first terminal device includes a sixth field. The format of the first uplink grant information may be related to a subcarrier spacing used by the BWP of the first terminal device, or related to a subcarrier spacing used for information transmission. For example, the sixth field (which may be content of the sixth field, a size of the sixth field, or a location of the sixth field) in the first uplink grant information is related to the subcarrier spacing used by the BWP of the first terminal device, or is related to the subcarrier spacing used for information transmission.

When a subcarrier spacing used by the resource is u1, a length of the sixth field is N1 bits. The resource herein may be a bandwidth resource. The bandwidth resource is a bandwidth resource configured by the access network device for the first terminal device or a bandwidth resource used by the first terminal device. The bandwidth resource may be a BWP or a carrier. When the subcarrier spacing used by the resource is u2, the length of the sixth field is N2 bits. N1 is not equal to N2. For example, the bandwidth resource of the first terminal device is 20 MHz. When the subcarrier spacing is 60 kHz, u1=2, the frequency domain resource allocation field includes 9 bits, a frequency hopping indicator field includes 1 bit, and a repetition quantity indication includes 4 bits, that is, N1=4. When the subcarrier spacing is 30 kHz, u2=1, the frequency domain resource allocation field includes 11 bits, the frequency hopping indicator field includes 2 bits, and the repetition quantity indication includes 2 bits, that is, N2=2. That is, when u1=2, N1-4; and when u2=1, N2=2.

Further, when the subcarrier spacing used by the resource is u1, the first grant information includes the sixth field, and the sixth field may indicate any one or more pieces of the following information: information about whether small packet transmission is allowed, small packet transmission information when small packet transmission is allowed, information about a 2-step random access channel, information about a 4-step RACH, information about whether the first terminal device is allowed to access a network, information about a 5-bit modulation and coding scheme, information about a quantity of repetitions of a scheduled PUSCH, information about a repetition type of the scheduled PUSCH, reporting capability indication information of the first terminal device, type information of the first terminal device, service type information of the first terminal device, subcarrier spacing information, TBS information, TBS threshold information, and beam direction information.

When the subcarrier spacing used by the resource is u2, the first uplink grant information may not include the sixth field. For example, the bandwidth of the first terminal device is 20 MHz. When the subcarrier spacing is 60 kHz, u1=2, the frequency domain resource allocation field includes 9 bits, the frequency hopping indicator field includes 1 bit, and the repetition quantity indication includes 3 bits. In this case, the first grant information further includes 2 bits of beam direction information. That is, the first grant information includes the sixth field. When the subcarrier spacing is 30 kHz, u2=1, the frequency domain resource allocation field includes 11 bits, the frequency hopping indicator field includes 2 bits, and the repetition quantity indication includes 2 bits. In this case, the first grant information does not include the beam direction information. That is, the first grant information does not include the sixth field.

Optionally, the length of the sixth field is less than 14-X.

In some embodiments, N is the quantity of resource blocks supported or configured by the first terminal device. Before sending the first uplink grant information, the access network device needs to determine locations and/or values of the N resource blocks. Before receiving the first uplink grant information, the first terminal device also needs to determine the locations and/or the values of the N resource blocks.

Some embodiments describe how to determine the locations of the N resource blocks and/or the value of N. For example, there are the following three optional manners:

In Manner 1, the first terminal device determines, based on first indication information sent by the access network device, that the bandwidth resource of the first terminal device is a first resource or a second resource. The bandwidth resource is a bandwidth resource configured for the first terminal device or a bandwidth resource used by the first terminal device. For example, the first resource is a first BWP resource. The second resource is a second BWP resource. The first terminal device obtains the locations of the N resource blocks and/or determines the value of N based on the bandwidth resource. For example, the N resource blocks are resource blocks included in the bandwidth resource.

In Manner 2, the first terminal device determines the locations of the N resource blocks based on second indication information sent by the access network device. For example, the second indication information may indicate at least a location of the bandwidth resource of the first terminal device. For example, the second indication information indicates a frequency offset, or indicates resource index information. Alternatively, the second indication information may indicate bandwidth information of the first terminal device, and the first terminal device determines the value of N based on the indicated bandwidth information of the first terminal device (in this case, the locations of the N resource blocks may be predefined).

In Manner 3, the first terminal device determines the value of N and/or the locations of the N resource blocks by using third indication information sent by the access network device. For example, the third indication information is initial BWP configuration information. The first terminal device determines the value of N and/or the locations of the N resource blocks based on the initial BWP configuration information. Particularly, the initial BWP configuration information may further be used to configure a resource for the second terminal device.

The following describes three manners:

Manner 1: The locations of the N resource blocks and/or the value may be determined by using the following S105 to S108:

S105. The access network device sends first indication information to the first terminal device. The first indication information indicates that a bandwidth resource of the first terminal device is a first resource or a second resource.

S106. The first terminal device receives the first indication information. When a value or a bit state (or a bit value) of the first indication information belongs to a first set, the first terminal device determines that the bandwidth resource of the first terminal device is the first resource. When the value or the bit state of the first indication information belongs to a second set, the first terminal device determines that the bandwidth resource of the first terminal device is the second resource. The first resource is different from the second resource. That the first resource and the second resource are not totally the same may be that the first resource does not overlap with the second resource, or the first resource partially overlaps with the second resource. For example, the first resource partially overlaps with the second resource. The access network device may configure the first resource for the first terminal device by using first initial BWP configuration information. Optionally, the first initial BWP configuration information may further be used to configure a resource for the second terminal device. In other words, the first terminal device and the second terminal device may read the same initial BWP configuration information. It should be noted that the first set and the second set may include one or more bit states or values.

The bandwidth resource may be a resource included in an uplink initial BWP, a downlink initial BWP, a control information resource set (CORESET), an uplink BWP, a downlink BWP, an uplink carrier, a downlink carrier, or the like.

The first indication information may be included in radio resource control (RRC) signaling, media access control control element (MAC CE) signaling, or DCI signaling. Further, the first terminal device may determine the bandwidth resource based on the first indication information.

Optionally, when the bit state of the first indication information belongs to the first set, the first terminal device determines that the bandwidth resource of the first terminal device is the first resource. When the bit state of the first indication information belongs to the second set, the first terminal device determines that the bandwidth resource of the first terminal device is the second resource. Resources included in the first resource and the second resource may be different. The first resource and the second resource may be different BWPs. The first set or the second set may include one or more bit states. For example, the first indication information is 1 bit, and the first set and the second set each include one bit state. For another example, the first indication information is a plurality of bits, and the first set and the second set each include one or more bit states. Optionally, the first indication information includes 1 bit. For example, the first set is "1", and the second set is "0". For example, if the bit state of the first indication information is "1", the first terminal device may determine, based on the first indication information, that the bandwidth resource of the first terminal device is the first resource, where the first resource is, for example, a first uplink initial BWP. If the state of the first indication information is "0", the first indication information indicates that the bandwidth resource of the first terminal device is the second resource, where the second resource may be, for example, a second uplink initial BWP.

Optionally, according to a predefined indication rule, the first indication information may indicate a relationship between the bandwidth resource of the first terminal device and the uplink initial BWP by using a bit value. For example, when the state of the first indication information is "1", the bandwidth resource that is of the first terminal device and that is indicated by the first indication information is inside the uplink initial BWP. When the state of the first indication information is "0", the bandwidth resource that is of the first terminal device and that is indicated by the first indication information is outside the uplink initial BWP.

In a possible implementation, the second resource and the first resource are resources that are not completely the same. In another possible implementation, the second resource may partially overlap with the first resource.

In this method, a resource may be configured for the first terminal device and the second terminal device by using common BWP configuration information. The first terminal device may determine the bandwidth resource based on the common BWP configuration information. In this communication system, signaling indication overheads can be reduced, and flexible resource indication can be implemented, thereby improving resource utilization while implementing load balancing.

In this method, the first resource may be a resource configured for the first terminal device, and whether the first resource can be used for the second terminal device is not limited in this application. The second resource may be used only for the first terminal device.

Optionally, the first resource may be configuration information of an uplink initial BWP, a downlink initial BWP, a CORESET, an uplink BWP, a downlink BWP, a downlink CORESET 0, an uplink carrier, a downlink carrier, or the like.

S107. The first terminal device determines the locations of the N resource blocks and/or the value of N based on the bandwidth resource of the first terminal device.

If the first indication information indicates that the bandwidth resource of the first terminal device is the first resource, the locations of the N resource blocks may be determined in the first resource. If the first indication information indicates that the bandwidth resource of the first terminal device is the second resource, the locations of the N resource blocks may be determined in the second resource. Further, the locations of the N resource blocks of the first terminal device in the bandwidth resource may be determined by using signaling or a predefined rule. For example, a quantity of resource blocks included in the bandwidth resource is N. The resource blocks included in the bandwidth resource are the N resource blocks.

The first terminal device may determine the value of N based on a bandwidth that can be supported by the first terminal device. The bandwidth that can be supported may be understood as at least one capability of a maximum signal bandwidth that can be received by the first terminal device and/or a maximum signal bandwidth that can be sent by the first terminal device. For example, the bandwidth that can be supported by the first terminal device is 20 MHz. If a subcarrier spacing is 15 kHz, the value of N is 106 RBs or 100 RBs.

It should be noted that an execution order of the two steps of determining the locations of the N resource blocks and determining the value of N may be exchanged, and the execution order is not limited in this application.

Manner 2: The locations of the N resource blocks and/or the value of N may be determined by using the following S105' to S107'.

S105'. The access network device sends second indication information to the first terminal device. The second indication information indicates the locations of the N resource blocks.

The second indication information indicates the locations of the N resource blocks in a bandwidth resource. The bandwidth resource is predefined or configured by using signaling. The signaling may be system information. The bandwidth resource may be a BWP. For example, the bandwidth resource is an uplink initial BWP. The second indication information includes offset value information. For example, the offset value information indicates an offset of the N resource blocks relative to the first RB in the uplink initial BWP. The first RB may be understood as an RB whose index is 0. For another example, the second indication information includes a resource block index value, and the resource block index value indicates the locations of the N resource blocks in the bandwidth resource.

In a first possible implementation, the locations of the N resource blocks are predefined. For example, it is predefined that start locations of the N resource blocks and the bandwidth resource of the first terminal device are the same. For another example, the first terminal device determines the start location of the bandwidth resource based on a supported bandwidth or a predefined rule, or through signaling notification by the access network device, and further determines the locations of the N resource blocks.

In a second possible implementation, the first terminal device determines the locations of the N resource blocks based on a first reference resource and the second indication information. For example, the first reference resource is a BWP, or a specific resource location in the BWP, or a point A, or a first common physical resource block (PRB), or a specific resource in a synchronization signal block (SSB). For example, when the first reference resource is a BWP, the first terminal device may determine, based on the first reference resource and the second indication information, that the N resource blocks are inside the BWP. For another example, the first terminal device determines, based on the first reference resource and the second indication information, that at least some of the N resource blocks are outside the BWP.

For example, the first reference resource includes a $10^{th}$ RB to a $19^{th}$ RB. A value range of an offset value indicated by the second indication information is {−5 RBs, 0 RBs, 5 RBs, 10 RBs}. If a value indicated by the second indication information is −5 RBs, the start location of the N resource blocks is a $(10-5)^{th}$ RB=$5^{th}$ RB. Assuming that the bandwidth supported by the first terminal device is 5 RBs, the bandwidth resource of the first terminal device includes the $5^{th}$ RB to a $9^{th}$ RB, and the N resource blocks of the first terminal device are outside the first reference resource. If the offset value indicated by the second indication information is 0, the start location of the N resource blocks of the first terminal device is the $(10-0)^{th}$ RB=$10^{th}$ RB. If the bandwidth supported by the first terminal device is 5 RBs, the N resource blocks of the first terminal device are inside the first reference resource.

S106'. After receiving the second indication information, the first terminal device determines the value of N based on the second indication information.

In some implementations in which the first terminal device determines the value of N is described in Manner 1, and details are not described herein again.

It should be noted that before sending the second indication information, the access network device also needs to determine the value of N. The value of N may be determined based on a bandwidth that can be supported by the first terminal device. The bandwidth that can be supported may be understood as at least one capability of a maximum signal bandwidth that can be received by the first terminal device and/or a maximum signal bandwidth that can be sent by the first terminal device.

Manner 3: The locations of the N resource blocks and/or the value may be determined by using the following S105" and S106".

S105". The access network device sends third indication information to the first terminal device. The third indication information includes first initial uplink BWP configuration information. The first initial uplink BWP configuration information may be further used for the second terminal device.

S106". After receiving the third indication information, the first terminal device determines the locations of the N resource blocks and/or the value of N based on the first initial uplink BWP configuration information.

The third indication information may be system information.

The first initial uplink BWP configuration information is sent by the access network device, and indicates a bandwidth resource of the first terminal device. The bandwidth resource may be a resource used by the first terminal device for uplink sending. The first initial uplink BWP configuration information is sent by the access network device. The first initial uplink BWP information may further indicate a bandwidth resource of the second terminal device. The bandwidth resource includes the value of N and/or the locations of the N resource blocks. The value of N and/or the locations of the N resource blocks may be determined based on the first initial uplink BWP configuration information.

For example, when a bandwidth supported by the first terminal device is less than a bandwidth configured for a first initial uplink BWP, the value of N and/or the locations of the N resource blocks may be determined by default or through signaling notification. For example, the value of N may be considered as the bandwidth supported by the first terminal device by default, and a frequency domain resource of an initial uplink BWP of the first terminal device is considered to be within a resource range of the first initial uplink BWP by default. For example, a start resource location of the frequency domain resource of the initial uplink BWP of the first terminal device is at a specific location in the first initial uplink BWP. For example, the start resource location of the frequency domain resource of the initial uplink BWP of the first terminal device is the same as a start resource location of the first initial uplink BWP.

Further, the method for determining the value of N and/or the locations of the N resource blocks based on the first initial uplink BWP is also applicable to determining, by the first terminal device, the N resource blocks based on first initial downlink BWP configuration information, CORESET configuration information, an uplink BWP, a downlink BWP, CORESET 0 configuration information, an uplink carrier, a downlink carrier, or the like.

Optionally, the first terminal device may alternatively determine the value of N by using S1081 and S1082.

S1081. The first terminal device determines a first value.

The first value is determined based on a capability (for example, a supported maximum channel bandwidth) of the first terminal device, or the first value may be preconfigured by the access network device, predefined in a protocol, or preset by a vendor.

S1082. The first terminal device determines the value of N based on the bandwidth resource and the first value.

For example, the bandwidth resource is predefined or configured by using signaling. The signaling may be system information. The bandwidth resource may be a size and/or a location of a BWP. It may be determined that the value of N=min {the bandwidth resource, the first value}. For example, if the bandwidth resource is 20 MHZ, and the bandwidth that can be supported by the first terminal device is 5 MHz, the first terminal device determines the value of N based on 5 MHz. Alternatively, if the bandwidth resource indicated by the signaling is 10 MHZ, and the first terminal device determines, based on the signaling from the access network device, that the first value is 20 MHz, the first terminal device determines the value of N based on 10 MHz.

Optionally, if the bandwidth resource is a first initial uplink BWP, the first terminal determines the value of N based on the first value and a size of the first initial uplink BWP. Optionally, the access network device may further send first initial uplink BWP configuration information to the second terminal device.

It should be noted that before sending the first indication information, the access network device also needs to determine the value of N. A determining manner is similar to a determining manner on a side of the first terminal device.

In some implementations, the access network device configures, by using third resource configuration information, the first terminal device to transmit information on a third resource. The third resource configuration information may further be used to configure a resource for the second terminal device. The third resource includes N11 RBs. A maximum quantity of resource blocks that can be used by the first terminal device to transmit information in the third resource is N21. N11 may be greater than N21. In this case, a frequency domain resource allocation field of the first terminal device determines, based on N21, a quantity of bits included in the field. A frequency domain resource allocation field of the second terminal device determines, based on N11, a quantity of bits included in the field.

A maximum quantity N of resource blocks that can be used for data transmission and that is determined by the first device in the first resource is different from a maximum quantity N of resource blocks that can be used for data transmission and that is determined by the second terminal device in the first resource. For example, when a subcarrier spacing is 15 kHz, the third resource includes 270 RBs. A bandwidth supported by the second terminal device is greater than 50 MHz or 270 RBs. A bandwidth supported by the first terminal device is equal to 20 MHz or 106 RBs. It may be determined that the maximum quantity N21 of resource blocks that can be used by the second terminal device for data transmission is 270 RBs. The maximum quantity N11 of resource blocks that can be used by the first terminal device for data transmission is 106 RBs. To be specific, when determining uplink grant information, the first terminal device interprets a frequency domain resource indicator field in the uplink grant information based on a supported bandwidth (for example, 106). The second terminal device interprets the frequency domain resource indicator field in the uplink grant information based on a quantity (for example, 270) of resource blocks included in the first resource that is notified by the access network device. For example, a length of the frequency domain resource allocation field in the first uplink grant format is determined based on N21. A length of the frequency domain resource allocation field in the second uplink grant format is determined based on N11. The value of N is determined in a predefined manner, and no additional signaling overhead is required.

According to the communication method provided in some embodiments, when frequency domain resource allocation indication is performed by using the first uplink grant information, for the first terminal device, the length of the frequency domain resource allocation field is related to the quantity N of resource blocks supported or configured by the first terminal device. To be specific, the length of the frequency domain resource allocation field is based on the quantity N of resource blocks supported or configured by the first terminal device, and is less than the length of the second frequency domain resource allocation field associated with the second uplink grant format. In some embodiments, no bit in the Y bits indicates the offset value during frequency hopping. Therefore, all the Y bits may be used for resource block indication, so that more flexible resource allocation can be provided (for example, a limitation on a length indication or a start point indication of resource block allocation is avoided).

To obtain a diversity gain, one data transmission may be divided into a plurality of segments of frequency hopping transmission in terms of time. Frequency resources corresponding to the segments of transmission are not totally the same. Each segment of transmission is one hop of transmission in frequency hopping transmission. In the present disclosure, any hop refers to any transmission or any segment of transmission in a plurality of times of frequency hopping transmission included in one data transmission. A corresponding resource is a resource occupied or used for data transmission.

In the current technology, when frequency hopping indication is performed, a 1-bit frequency hopping indicator field in uplink scheduling information indicates whether to perform frequency hopping in this transmission. If frequency hopping is to be performed, frequency hopping indication is performed based on 1 bit or 2 bits in a frequency domain resource allocation field in grant information. An offset value of a frequency domain location of a second hop relative to a previous hop is indicated. When an allocable bandwidth is less than 50 RBs, 1 bit is used for frequency hopping indication. When the allocable bandwidth is greater than or equal to 50 RBs, 2 bits are used for frequency hopping indication. Low-complexity UEs have limited capabilities. For example, a maximum channel bandwidth that can be supported may be less than or equal to 20 MHz.

For example, a frequency domain resource allocation field in uplink grant information included in a random access response is fixed at 14 bits. At a 15 kHz subcarrier spacing, a quantity N of allocable frequency domain resource blocks corresponding to 20 MHz is 106 RBs. When frequency hopping is indicated, if the existing protocol is still used, the frequency domain resource allocation field is truncated to a length of $$\log_2 \frac{106 \times (106+1)}{2} = 13$$

bits. 2 bits int the 13 bits indicate an offset value, and remaining 11 bits in the 13 bits indicate a location of an allocated frequency domain resource. A quantity of states that can be indicated is reduced from $2^{13}$ to $2^{11}$, but 1 remaining bit is idle and not used. Similarly, when the quantity N of allocable frequency domain resource blocks is 50 RBs, the frequency domain resource allocation field is truncated to a length of $$\log_2 \frac{50 \times (50+1)}{2} = 11$$

bits. 2 bits in the 11 bits indicate an offset value, and remaining 9 bits in the 11 bits indicate a location of an allocated frequency domain resource. A quantity of states that can be indicated is reduced from $2^{11}$ to $2^9$, but 3 remaining bits are idle and not used. It can be learned that in the current technology, because 1 or 2 bits in the frequency domain resource allocation field need to be occupied for indicating the offset value during frequency hopping, a quantity of states used for frequency domain resource allocation is reduced, and frequency domain resource allocation is limited. In addition, an idle bit cannot be used, causing a waste of bit resources. To resolve this problem, based on the method shown in FIG. 2, the embodiments of this application further have the following five implementations:

Manner 1: The first uplink grant information further includes a second field. The second field indicates at least one of whether to perform frequency hopping and an offset value. The offset value may be one or more of a frequency hopping offset, a frequency offset value, or a time offset value. The offset value may be an offset value used for next-hop transmission on the determined resource. For example, in this manner, whether to perform frequency hopping and the offset value are indicated through joint coding. If the second field indicates whether to perform frequency hopping and the offset value during frequency hopping, the terminal device determines a second-hop resource based on the offset value. In the existing protocol, intra-slot frequency hopping is determining an information location of a second hop by performing summation based on the frequency domain resource allocation information and the offset value and performing a modulo operation by using a BWP bandwidth. Inter-slot frequency hopping is determining, based on whether i of an $i^{th}$ time of frequency hopping is an odd number or an even number, whether the frequency hopping frequency domain resource allocation information is summed up with the offset value, and performing a modulo operation by using the BWP bandwidth. The BWP bandwidth is a maximum quantity of resource blocks that can be used for information transmission and that are included in a configured or predefined BWP.

The second field and the first field are independent of each other. The second field is a frequency hopping indicator field. The second field and the first field are independent of each other, so that frequency hopping indication can be prevented from occupying the frequency domain resource allocation field, a quantity of available bits in the frequency domain resource allocation field is increased, and frequency domain resource allocation flexibility is improved.

In Manner 1, optionally, the second field can indicate at least one of the following bit states. The second field indicates at least one of whether to perform frequency hopping and the offset value by using at least one of the following bit states:
- a first bit state, indicating not to perform frequency hopping;
- a second bit state, indicating to perform frequency hopping and that the offset value is a first offset value; or the second bit state is a reserved state;
- a third bit state, indicating to perform frequency hopping and that the offset value is a second offset value; or the third bit state is a reserved state; and
- a fourth bit state, indicating to perform frequency hopping and that the offset value is a third offset value; or the fourth bit state is a reserved state.

"Not to perform frequency hopping" means that frequency hopping is not performed for the uplink transmission, or frequency hopping is disabled (e.g., disable frequency hopping). The offset value during frequency hopping may be a frequency offset value of the second hop; or may be a frequency offset value of one frequency hopping transmission in a plurality of times of frequency hopping relative to a previous frequency hopping transmission.

Optionally, the offset value includes at least one of $$\frac{1}{4}N, \frac{1}{2}N, \text{ and } -\frac{1}{4}N.$$

In an implementation, the second field may be 2 bits, and indicates not to perform frequency hopping and the offset value during frequency hopping. Table 1 is an example of the bit state of the second field and the indicated information. As shown in Table 1a and Table 1b, the bit state of the second field and the indicated information are shown based on the value of N. The bit state of the second field includes 00, 01, 10, and 11. For example, Table 1 a shows a case in which N<50. For example, when N<50, the bit state 00 indicates to perform frequency hopping and the offset value is $$\frac{1}{2}N,$$

the bit state 01 indicates to perform frequency hopping and the offset value is $$\frac{1}{4}N,$$

the bit state 10 is reserved, and the bit state 11 indicates not to perform frequency hopping. For example, Table 1b shows a case in which N≥50. For example, when N≥50, the bit state 00 indicates to perform frequency hopping and the offset value is $$\frac{1}{2}N,$$

the bit state 01 indicates to perform frequency hopping and the offset value is $$\frac{1}{4}N,$$

the bit state 10 indicated to perform frequency hopping and the offset value is $$-\frac{1}{4}N,$$

and the bit state 11 indicates not to perform frequency hopping. In this application, a threshold for determining the value of N is 50, and the offset value during frequency hopping is $$\frac{1}{4}N, \frac{1}{2}N, \text{ or } -\frac{1}{4}N.$$

However, it may be understood that this is merely an example, and N and the offset value during frequency hopping may be other values.

TABLE 1a

| Range of N | Bit state of the second field | Indicated information |
|---|---|---|
| N < 50 | 00 | $\frac{1}{2}N$ |
| | 01 | $\frac{1}{4}N$ |
| | 10 | Reserved |
| | 11 | No frequency hopping |

TABLE 1b

| Range of N | Bit state of the second field | Indicated information |
|---|---|---|
| N ≥ 50 | 00 | $\frac{1}{2}N$ |
| | 01 | $\frac{1}{4}N$ |
| | 10 | $-\frac{1}{4}N$ |
| | 11 | No frequency hopping |

Table 2 is another example of the bit state of the second field and the indicated information. As shown in Table 2, the bit state 00 indicates to perform frequency hopping and the offset value is $$\frac{1}{2}N.$$

The bit state 01 indicate to perform frequency hopping and the offset value $$\frac{1}{4}N.$$

When N<50, the bit state 10 is reserved. When N≥50, the bit state 10 indicates to perform frequency hopping and the offset value is $$-\frac{1}{4}N.$$

The vit State 11 indicates not to perform frequency hopping.

TABLE 2

| Bit state of the second field | Indicated information |
|---|---|
| 00 | $\frac{1}{2}N$ |
| 01 | $\frac{1}{4}N$ |
| 10 | Reserved if N < 50 |
|  | $-\frac{1}{4}N$ if $N \geq 50$ |
| 11 | No frequency hopping |

In another implementation, the second field indicates not to perform frequency hopping and the offset value during frequency hopping. Table 3a and Table 3b are examples of the bit state of the second field and the indicated information. As shown in Table 3a, when N≥50, the second field may be 2 bits. The bit state of the second field includes four states: 00, 01, 10, and 11. The bit state 00 indicates to perform frequency hopping and the offset value is $$\frac{1}{2}N.$$

The bit state 01 indicates to perform frequency hopping and the offset value is $$\frac{1}{4}N.$$

The bit state 10 indicates to perform frequency hopping and the offset value is $$-\frac{1}{4}N.$$

The bit state 11 indicate not to perform frequency hopping. As shown in Table 3b, when N<50, the second field is 1 bit, and the first uplink grant information further includes a 1-bit frequency hopping enabling field (indicating whether to perform frequency hopping). In this case, the bit state of the second field includes two states: 0 and 1. The bit state 0 indicates to perform frequency hopping and the offset value is $$\frac{1}{2}N,$$

and the bit state 1 indicates to perform frequency hopping and the offset value is $$\frac{1}{4}N.$$

Therefore, when N<50, 2 bits also indicate whether to perform frequency hopping and the offset value.

TABLE 3a

| Range of N | Bit state of the second field | Indicated information |
|---|---|---|
| N ≥ 50 | 00 | $\frac{1}{2}N$ |
|  | 01 | $\frac{1}{4}N$ |
|  | 10 | $-\frac{1}{4}N$ |
|  | 11 | No frequency hopping |

TABLE 3b

| Range of N | Bit state of the second field | Indicated information |
|---|---|---|
| N < 50 | 0 | $\frac{1}{2}N$ |
|  | 1 | $\frac{1}{4}N$ |

It may be understood that the bit states of the second field and the indicated information shown in Table 1, Table 2, and Table 3 are examples, and there may be another manner. This is not limited in this embodiment.

In Manner 1, optionally, a correspondence between the at least one bit state and the at least one offset value is predefined, or is configured by using signaling. For example, the access network device sends signaling to the first terminal device, where the signaling carries the correspondence between the at least one bit state and the at least one offset value.

Manner 2: The offset value is determined based on a third field and first information. The first information is predefined, or the first information is configured by using signaling. The third field is included in the first uplink grant information.

The access network device jointly indicates (for example, independently indicates or jointly indicates) the offset value to the first terminal device by using the third field and the first information. For example, the first information indicates the offset value together with the third field. For example, the first information may be the first bit or the latter bit in two bits. For example, specifically, a value of 1 bit indicating the offset value may be predefined or configured by using signaling, and 1 bit in the third field indicates a value of another bit of the offset value. For example, for the bit state "01" indicating the offset value, the first bit value may be configured as "0" through predefinition or by using signaling (for example, higher layer signaling, RRC signaling, or MAC CE signaling), and 1 bit in the third field is indicated as "1". Therefore, offset value indication does not occupy any bit in the first field, a quantity of frequency domain resource allocable states that can be indicated is not reduced, and frequency domain resource allocation is not limited.

Further, N meets a first condition, and the access network device indicates, in Manner 2, whether to perform frequency hopping or an offset value during frequency hopping. Correspondingly, the terminal device determines, in Manner 2, whether to perform frequency hopping or the offset value during frequency hopping. If N meets a second condition, the access network device indicates, in Manner 1 or a manner defined in the existing protocol, whether to perform frequency hopping or an offset value during frequency hopping. Correspondingly, the terminal device determines, in Manner 1 or the manner defined in the existing protocol, whether to perform frequency hopping or the offset value during frequency hopping. For example, when N is within a first value range (for example, $91 \leq N \leq 100$), the access network device indicates, in Manner 2, whether to perform frequency hopping or the offset value during frequency hopping. Correspondingly, the terminal device determines, in Manner 2, whether to perform frequency hopping or the offset value during frequency hopping. Otherwise, the access network device indicates, in Manner 1, whether to perform frequency hopping or the offset value during frequency hopping. Correspondingly, the terminal device determines, in Manner 1, whether to perform frequency hopping or the offset value during frequency hopping.

Alternatively, the access network device indicates, to the first terminal device, whether to determine, in Manner 1 or Manner 2, whether to perform frequency hopping or the offset value during frequency hopping.

Manner 3: When N is within a first value range, whether to perform frequency hopping is determined based on higher layer signaling; and when N is within a second value range, whether to perform frequency hopping is determined based on the first uplink grant information.

The higher layer signaling may be RRC signaling or MAC CE signaling. For example, when N is within the first value range (for example, $91 \leq N \leq 100$), the access network device notifies, by using RRC signaling, the terminal device whether to perform frequency hopping. Correspondingly, the terminal device determines, based on the RRC signaling, whether to perform frequency hopping. Otherwise, the access network device indicates, in the first uplink grant information, whether to perform frequency hopping. Correspondingly, the terminal device determines, based on information in the first uplink grant information, whether to perform frequency hopping. The offset value may be included in the first uplink grant information.

For example, the first terminal device determines, based on second information, whether to perform frequency hopping. The second information is predefined, or the second information is indicated by using signaling.

Optionally, the second information is predefined. For example, it may be predefined that the first terminal device necessarily performs frequency hopping. In this way, an existing frequency hopping indicator field is not required, and 1 bit may be idle. Alternatively, the second information is predefined. For example, it may be predefined that the first terminal device does not perform frequency hopping. In this way, the existing frequency hopping indicator field is also not required, and 1 bit may also be idle.

Optionally, the second information is indicated by using signaling. For example, the access network device may send signaling to the first terminal device, where the signaling carries information indicating whether to perform frequency hopping. The signaling may be higher layer signaling, for example, RRC signaling or MAC CE signaling. Similarly, the existing frequency hopping indicator field is not required, and 1 bit may be idle.

When determining, based on the second information, to perform frequency hopping, the first terminal device determines the offset value during frequency hopping based on a fourth field. The fourth field is included in the first uplink grant information.

The first terminal device determines, based on the second information, whether to perform frequency hopping. In this way, the first uplink grant information does not need the existing frequency hopping indicator field, and 1 bit may be idle. The fourth field may indicate the offset value during frequency hopping. For example, 1 idle bit and 1 bit in the X bits of the frequency domain resource allocation field of the first uplink grant information may indicate the offset value during frequency hopping. The frequency hopping indication does not occupy any bit in the first field. Therefore, a quantity of frequency domain resource allocable states that can be indicated is not reduced, thereby improving frequency domain resource allocation flexibility.

In Manner 3, further, when N is within the first value range, the access network device indicates, based on the second information, whether to perform frequency hopping. When N is within the second value range, the access network device indicates, based on a fifth field, whether to perform frequency hopping or the offset value during frequency hopping. The fifth field is included in the first uplink grant information. Correspondingly, for the first terminal device, when N is within the first value range, the first terminal device determines, based on the second information, whether to perform frequency hopping; and when N is within the second value range, the first terminal device determines, based on the fifth field, whether to perform frequency hopping and/or the offset value during frequency hopping. The fifth field is included in the first uplink grant information. The fifth field is a field independent of the first field. The fifth field indicates whether to perform frequency hopping or the offset value during frequency hopping. Similarly, the frequency hopping indication does not occupy any bit in the first field. Therefore, the quantity of frequency domain resource allocable states that can be indicated is not reduced, and frequency domain resource allocation is not limited.

The first value range may be different from the second value range. The first value range may alternatively partially overlap with the second value range. For example, the first value range is a value corresponding to N when a sum of a quantity of bits required for the frequency domain resource and a quantity of bits required for the offset value is greater than X. The second value range is a value corresponding to N when a sum of the quantity of bits required for the frequency domain resource and the quantity of bits required for the offset value is less than or equal to X. For example, the first value range is $N \geq 91$, the quantity of bits required for the frequency domain resource indication is equal to 13, the quantity of bits required for the offset value is equal to 2, and a total of 14 bits are required. The second value range is $50 \leq N \leq 90$, the quantity of bits required for the frequency domain resource indication is less than or equal to 12, the quantity of bits required for the offset value is equal to 2, and a total quantity of bits required is less than or equal to 14. Alternatively, the second value range is N<50, the quantity of bits required for the frequency domain resource indication is less than or equal to 11, the quantity of bits required for the offset value is equal to 1, and a total quantity of bits required is less than or equal to 12.

Manner 4: The first uplink grant information does not include a reserved field and/or a channel state information request field.

In Manner 4, the first uplink grant information does not include a reserved field and/or a channel state information request field, but the first uplink grant information includes a field indicating whether to perform frequency hopping and an offset value during frequency hopping. The reserved field and/or the channel state information request field and 1 bit in the X bits in the existing frequency domain resource allocation field may indicate whether to perform frequency hopping and the offset value during frequency hopping. The frequency hopping indication does not occupy any bit in the first field. Therefore, a quantity of frequency domain resource allocable states that can be indicated is not reduced, thereby improving frequency domain resource allocation flexibility. It should be noted that, in the current technology, the first uplink grant information includes the reserved field and/or the channel state information request field.

Manner 5: A resource that is determined according to a predefined rule and that corresponds to any hop of the uplink transmission can only be within a specific resource, or a resource that is determined according to a predefined rule and that corresponds to at least one hop of the uplink transmission can be outside a specific resource.

Alternatively, sixth signaling is received, where the sixth signaling indicates that a resource corresponding to any hop of the uplink transmission can only be within a specific resource, or indicates that a resource corresponding to at least one hop of the uplink transmission can be outside a specific resource.

Alternatively, a seventh field in the first uplink grant information is received, where the seventh field indicates that a resource corresponding to any hop of the uplink transmission can only be within a specific resource, or indicates that a resource corresponding to at least one hop of the uplink transmission can be outside a specific resource.

The specific resource may be a resource configured by a base station. For example, the specific resource may be a BWP resource.

Optionally, it is determined, according to the predefined rule, that a resource corresponding to any hop of the uplink transmission can only be within the specific resource, or it is determined that a resource corresponding to at least one hop of the uplink transmission can be outside the specific resource. In other words, "according to the predefined rule" may be "based on a size of a bandwidth supported by the terminal device and/or a size of a resource configured by the access network device". For example, if the bandwidth supported by the terminal device is less than the size of the resource configured by the access network device, it is determined that frequency hopping transmission may be performed outside the specific resource. If the bandwidth supported by the terminal device is greater than the size of the resource configured by the access network device, it is determined that frequency hopping transmission can be performed only within the specific resource.

Further, the offset value during frequency hopping may be determined based on the resource configured by the access network device. "Outside the specific resource" means that the resource of the terminal device is outside a resource preconfigured by the access network device, or the resource of the terminal device is outside a pre-specified resource, or the resource of the terminal device is greater than a bandwidth that can be supported by the terminal device. For example, if the bandwidth that can be supported by the terminal device is 20 MHZ, and the resource configured by the access network device is 100 MHz, it is specified that N in the offset value during frequency hopping of the terminal device is calculated based on 100 MHz. For example, N/2=100 MHz/2=50 MHz, that is, a frequency offset value of a current frequency hopping transmission is 50 MHz relative to a previous frequency hopping transmission. Alternatively, it is specified that a frequency domain resource F for a current frequency hopping transmission is equal to a sum of a resource value for a previous frequency hopping transmission and a frequency offset value. In the current technology, a modulo operation needs to be performed on F (resource bandwidth). In the present disclosure, if it is determined that a resource corresponding to a hop is outside the specific resource, a modulo operation may not be performed during calculation. The frequency resource corresponding to the current frequency hopping transmission is directly determined based on a result of the resource value of the previous frequency hopping transmission and the frequency offset value.

Optionally, the sixth signaling is received, where the sixth signaling indicates that a resource corresponding to any hop of the uplink transmission can only be within the specific resource, or indicates that a resource corresponding to at least one hop of the uplink transmission can be outside the specific resource. The terminal device determines, based on the sixth signaling, whether a resource for one-hop transmission is within or outside the specific resource. The sixth signaling may be one of RRC signaling, DCI signaling, or MAC CE signaling. Optionally, different states of the sixth signaling may further indicate whether a resource corresponding to any hop can be only within the specific resource or outside the specific resource. For example, as shown in Table 4, a state "11" indicates not to perform frequency hopping. A state "00" indicates to perform frequency hopping, and frequency hopping can be performed only within the specific resource; or "00" indicates a first frequency hopping offset value of frequency hopping within the specific resource, and/or indicates to use a first frequency hopping calculation manner. A frequency hopping calculation manner may be a frequency domain resource of a previous hop+a frequency hopping offset value mod (e.g., a resource bandwidth) according to the current technology, where mod is a modulo operation, or may be a frequency domain resource of a previous hop+a frequency hopping offset value. A state "01" indicates to perform frequency hopping, and frequency hopping can be performed only within the specific resource; or "01" may indicate a second frequency hopping offset value of frequency hopping within the specific resource, and/or indicate to use the first frequency hopping calculation manner. A state "10" indicates to perform frequency hopping, and a resource corresponding to at least one hop of the uplink transmission may be outside the specific resource; or "10" may indicate a third frequency hopping offset value of frequency hopping within the specific resource, and/or indicate to use a second frequency hopping calculation manner. The first frequency offset value, the second frequency offset value, and the third frequency offset value may be a same value or different values. The first frequency hopping calculation manner and the first frequency hopping calculation manner may be a same calculation manner or may be different calculation manners.

TABLE 4

| Bit state of sixth signaling | Indicated information |
| --- | --- |
| 00 | Frequency hopping within the specific resource, the first frequency offset value, and/or the first frequency hopping calculation manner |
| 01 | Frequency hopping within the specific resource, the second frequency offset value, and/or the first frequency hopping calculation manner |
| 10 | Frequency hopping outside the specific resource, the third frequency offset value, and/or the second frequency hopping calculation manner |
| 11 | No frequency hopping |

Optionally, the seventh field in the first uplink grant information is received, where the seventh field indicates that a resource corresponding to any hop of the uplink transmission can only be within the specific resource, or indicates that a resource corresponding to at least one hop of the uplink transmission can be outside the specific resource. The method may be the same as that in the previous embodiment, and details are not described herein again.

In a possible embodiment, if there is an idle bit in the first uplink grant information, to improve resource utilization of the idle bit, in an implementation, the first uplink grant information may include at least one field, that is, the idle bit may correspond to the at least one field, each of the at least one field indicates one piece of information, and the piece of information includes any one of the following information: information about whether small packet transmission is allowed, small packet transmission information when small packet transmission is allowed, information about a 2-step random access channel, information about a 4-step RACH, information about whether the first terminal device is allowed to access a network, information about a 5-bit modulation and coding scheme, information about a quantity of repetitions of a scheduled PUSCH, information about a repetition type of the scheduled PUSCH, reporting capability indication information of the first terminal device, type information of the first terminal device, service type information of the first terminal device, subcarrier spacing information, TBS information, and TBS threshold information.

For example, the grant information indicates the terminal device to access a network by using a 4-step RACH. For another example, the grant information indicates the terminal device using a 2-step RACH to roll back to the 4-step RACH to perform random access.

In the existing protocol, an MCS included in uplink grant information in a random response is 4 bits. Therefore, at most 16 MCS indexes can be indicated. In some embodiments, a quantity of bits of an MCS indicator field is 5 bits, and at most 32 MCS indexes may be performed.

In a possible embodiment, the first uplink grant information may include a sixth field, and when a subcarrier spacing used by a resource is u1, a length of the sixth field is N1 bits; and when the subcarrier spacing used by the resource is u2, the length of the sixth field is N2 bits, and N1 is not equal to N2.

Figure 3:
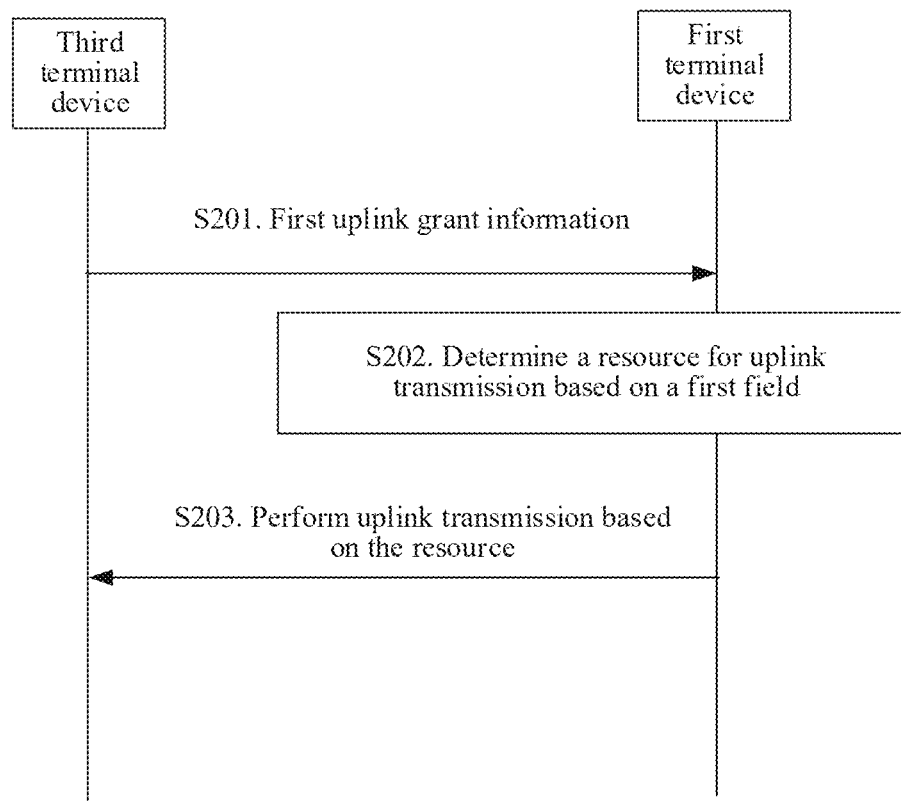
FIG. 3 is an interaction flowchart of an embodiment of a communication method according to this application.

FIG. 3 is an interaction flowchart of an embodiment of a communication method according to this application. As shown in FIG. 3, the method in some embodiments is applicable to a first terminal device. Some embodiments are applicable to D2D signal transmission. A bandwidth of a third terminal device is different from a bandwidth of the first terminal device. For example, the first terminal device may be a terminal device whose bandwidth is less than or equal to 20 MHz, or a terminal device whose quantity of resource blocks on the bandwidth is less than 106 RBs. Correspondingly, the third terminal device may be a terminal device whose bandwidth is greater than 20 MHz, or a device whose quantity of resource blocks on the bandwidth is greater than 106 RBs. For example, the third terminal device may alternatively be a terminal device whose bandwidth is greater than 20 MHz. Correspondingly, the first terminal device may alternatively be a terminal device whose bandwidth is less than 10 MHz. Bandwidths of the third terminal device and the first terminal device are not limited in this embodiment. According to the method in some embodiments, a problem of limited resource allocation caused by truncation of a frequency domain resource allocation field can be avoided, frequency domain resources can be used more effectively, and a resource waste can be avoided. The method in some embodiments may include the following steps.

S201. A third terminal device sends first uplink grant information to the first terminal device.

The first uplink grant information includes a first field, the first field indicates frequency domain resource allocation information, and a length Y of the first field is less than X. Y is determined based on a quantity N of resource blocks on the bandwidth of the first terminal device, and N is a positive integer. The first uplink grant information may also be sidelink grant information. The sidelink grant information indicates a resource of information sent by the first terminal device to another terminal device. Because both uplink transmission and sidelink transmission are sent by a terminal device, uplink transmission in the present disclosure also includes sidelink transmission.

Y is determined based on the quantity N of the resource blocks on the bandwidth of the first terminal device. In some implementations, Y may be $$\left\lceil \log_2 \frac{N \times (N+1)}{2} \right\rceil,$$

where N is the quantity of resource blocks on the bandwidth of the first terminal device, and ⌈ ⌉ is ceiling. N may be determined based on one or more of a bandwidth supported by the terminal device, a configuration of an access network device, or a detection result of the terminal device.

For example, X is a fixed value, and X is 14 bits. For a reduced capability terminal device, according to a stipulation in an existing protocol, a 14-bit frequency domain resource allocation field in uplink grant information of a random access response is truncated to a length of $$\log_2 \frac{N \times (N+1)}{2},$$

where a low bit in the 14-bit frequency domain resource allocation field is reserved, and there is an idle bit. When frequency domain resource allocation indication is performed according to the stipulation in the existing protocol, bits in the frequency domain resource allocation field may not be fully used, and the resource allocation field may not indicate resource allocation of some lengths, leading to problems of inflexible resource indication and ineffective resource utilization. In the present disclosure, the length of the frequency domain resource allocation field is related to a quantity N of resource blocks supported or configured by the first terminal device. For example, the frequency domain resource allocation field of the uplink grant information in the random access response sent to the first terminal device is less than 14 bits. In this way, the field for allocating a frequency domain resource to the first terminal device can be used to flexibly allocate resource blocks. Therefore, a problem that resource blocks of some lengths cannot indicate more effective indication and use frequency domain resources can be avoided, thereby avoiding a resource waste and improving resource allocation flexibility.

In some embodiments, optionally, the first uplink grant information may be included in any one of random access response information, sidelink control information, or uplink scheduling information.

In some embodiments, the third terminal device may determine the first uplink grant information by receiving instructions of a network side device, and forward the first uplink grant information to the first terminal device. Alternatively, the third terminal device may determine the first uplink grant information by using a channel monitoring result. Channel monitoring may be a method such as channel sensing or listen before talk (LBT), which is not limited in this embodiment.

S202. The first terminal device receives the first uplink grant information from the third terminal device. The first uplink grant information includes a first field. Further, the first terminal device determines a resource for uplink transmission based on the first field. The resource is a frequency domain resource that is allocated by the access network device to the first terminal device and that is indicated by the first field. The frequency domain resource may be any one of one or more RBs, REs, REGs, REG bundles, subcarriers, carriers, or BWPs.

The first uplink grant information includes the first field, and the first field indicates the frequency domain resource allocation information. The first terminal device may determine, based on the frequency domain resource allocation information indicated by the first field, the frequency domain resource to be allocated to the first terminal device, where the frequency domain resource is used for performing uplink transmission.

S203. The first terminal device performs uplink transmission based on the resource.

The first terminal device determines the resource for uplink transmission based on the frequency domain resource allocation information indicated by the first field, and performs uplink transmission based on the resource.

In some embodiments, there are three optional manners for determining locations of the resource blocks and a value of the quantity N of the resource blocks included in a bandwidth resource of the first terminal device. For details, refer to descriptions of Manner 1 to Manner 3 in the embodiment shown in FIG. 2. Details are not described herein again. A difference between this embodiment and the embodiment shown in FIG. 2 lies in that the first indication information and the second indication information in this embodiment come from the third terminal device.

According to the communication method provided in some embodiments, the third terminal device sends the first uplink grant information to the first terminal device. When frequency domain resource allocation indication is performed by using the first uplink grant information, the length of the frequency domain resource allocation field is related to the quantity N of resource blocks supported or configured by the first terminal device. The length of the frequency domain resource allocation field may be determined based on N, that is, the length of the frequency domain resource allocation field varies along with the quantity N of resource blocks included in the bandwidth resource of the first terminal device, and is less than the length of the frequency domain resource allocation field of the second terminal device. The length of the frequency domain resource allocation field of the first terminal device is allocated as required. Therefore, the frequency domain resource allocation field can be prevented from being truncated, frequency domain resources can be used more effectively, and a resource waste can be avoided.

Further, to resolve a problem in conventional technology that frequency domain resource allocation is limited caused by a reduced quantity of frequency domain resource allocable states that can be indicated because bits in the frequency domain resource allocation field are occupied during frequency hopping indication, there are four implementations in some embodiments of this application, which are the same as the four implementations shown in the foregoing embodiments. For details, refer to Manner 1, Manner 2, Manner 3, Manner 4, and Manner 5. Details are not described herein again.

Figure 4:
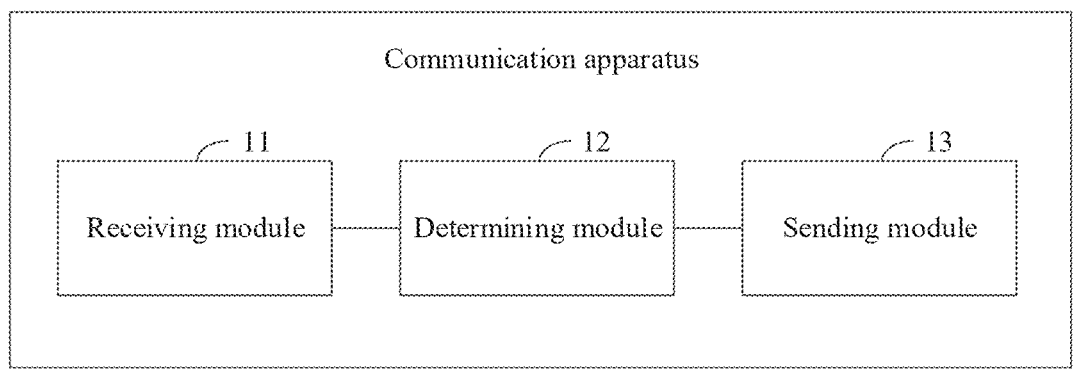
FIG. 4 is a schematic diagram of a structure of an embodiment of a communication apparatus according to this application.

FIG. 4 is a schematic diagram of a structure of an embodiment of a communication apparatus according to this application. As shown in FIG. 4, the apparatus in some embodiments may include a receiving module 11, a determining module 12, and a sending module 13.

The receiving module 11 is configured to receive first uplink grant information, where the first uplink grant information includes a first field, the first field indicates frequency domain resource allocation information, and a length Y of the first field is less than X, where X is a pre-specified value; or X is a length of a second frequency domain resource allocation field associated with a second uplink grant format, and the communication apparatus does not support the second uplink grant format; and Y is related to a quantity N of resource blocks supported or configured by the communication apparatus, and N is a positive integer.

The determining module 12 is configured to determine a resource for uplink transmission based on the first field.

The sending module 13 is configured to perform uplink transmission on the resource.

It should be noted that a function of the receiving module 11 and a function of the sending module 13 may be implemented by a same module, for example, both are implemented by a transceiver module.

Optionally, a first-type terminal device and a first terminal device have different capabilities.

Optionally, the first uplink grant information further includes a second field, the second field indicates at least one of whether to perform frequency hopping and an offset value, and the offset value is an offset value for performing frequency hopping transmission on the resource.

Optionally, the second field can indicate at least one of the following bit states:

a first bit state, indicating not to perform frequency hopping;

a second bit state, indicating to perform frequency hopping and that the offset value is a first offset value; or the second bit state is a reserved state;

a third bit state, indicating to perform frequency hopping and that the offset value is a second offset value; or the third bit state is a reserved state; and a fourth bit state, indicating to perform frequency hopping and that the offset value is a third offset value; or the fourth bit state is a reserved state.

Optionally, the offset value includes at least one of $$\frac{1}{4}N, \frac{1}{2}N, \text{ and } -\frac{1}{4}N.$$

Optionally, the offset value is determined based on a third field and first information, where the third field is included in the first uplink grant information; and the first information is predefined, or the first information is configured by using signaling.

Optionally, the determining module is further configured to: before the receiving module receives the first uplink grant information, determine, based on second information, whether to perform frequency hopping, where the second information is predefined, or the second information is configured by using signaling; and when it is determined, based on the second information, to perform frequency hopping, determine an offset value during frequency hopping based on a fourth field, where the fourth field is included in the first uplink grant information.

Optionally, the determining module is configured to:
when N is within a first value range, determine, based on the second information, whether to perform frequency hopping; and
when N is within a second value range, determine, based on a fifth field, whether to perform frequency hopping and/or the offset value during frequency hopping, where the fifth field is included in the first uplink grant information; and/or
when N is within the first value range, configure, by using RRC signaling, whether to perform frequency hopping; and
when N is within the second value range, indicate, by using the first uplink grant information, whether to perform frequency hopping.

Optionally, the first uplink grant information does not include a reserved field and/or a channel state information request field.

Optionally, each of at least one field included in the first uplink grant information indicates one piece of information, and the piece of information includes any one or more pieces of the following information: information about whether small packet transmission is allowed, small packet transmission information when small packet transmission is allowed, information about a 2-step random access channel, information about a 4-step RACH, information about whether the first terminal device is allowed to access a network, information about a 5-bit modulation and coding scheme, information about a quantity of repetitions of a scheduled PUSCH, information about a repetition type of the scheduled PUSCH, reporting capability indication information of the first terminal device, type information of the first terminal device, service type information of the first terminal device, subcarrier spacing information, TBS information, and TBS threshold information.

Optionally, the first uplink grant information includes a sixth field, and when a subcarrier spacing used by the resource is u1, a length of the sixth field is N1 bits; and when the subcarrier spacing used by the resource is u2, the length of the sixth field is N2 bits, and N1 is not equal to N2.

Optionally, the receiving module 11 is further configured to receive first indication information; and the determining module 12 is further configured to: when a value or a bit state of the first indication information belongs to a first set, determine that a bandwidth resource of the first terminal device is a first resource; and when the value or the bit state of the first indication information belongs to a second set, determine that the bandwidth resource of the first terminal device is a second resource, where the first resource is different from the second resource, or the first range partially overlaps with the second range.

Optionally, the determining module 12 is further configured to determine locations of the N resource blocks and/or a value of N based on the bandwidth resource of the first terminal device.

Optionally, the locations of the N resource blocks are indicated to the first terminal device by using second indication information, or the locations of the N resource blocks are predefined.

Optionally, the determining module 12 is further configured to determine the value of N based on a bandwidth that can be supported by the first terminal device.

Optionally, the determining module 12 is further configured to determine a first value based on a capability of the first terminal device; and determine the value of N based on the bandwidth resource and the first value.

In a possible design, the receiving module 11 is further configured to receive third indication information, where the third indication information includes first initial uplink BWP configuration information; and the determining module 12 is further configured to determine the locations of the N resource blocks and/or the value of N based on the first initial uplink BWP configuration information.

The apparatus in some embodiments may be configured to perform the technical solutions of the foregoing method embodiments. An implementation principle and a technical effect of the apparatus are similar to those of the method embodiments, and details are not described herein again.

Figure 5:
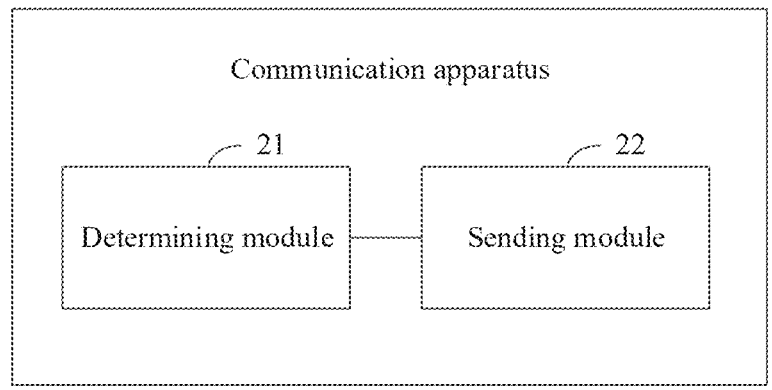
FIG. 5 is a schematic diagram of a structure of an embodiment of a communication apparatus according to this application.

FIG. 5 is a schematic diagram of a structure of an embodiment of a communication apparatus according to this application. As shown in FIG. 5, the apparatus in some embodiments may include a determining module 21 and a sending module 22.

The determining module 21 is configured to determine first uplink grant information, where the first uplink grant information includes a first field, the first field indicates frequency domain resource allocation information, and a length Y of the first field is less than X, where X is a pre-specified value; or X is a length of a second frequency domain resource allocation field associated with a second uplink grant format, and a first terminal device does not support the second uplink grant format; and Y is related to a quantity N of resource blocks supported or configured by the first terminal device, and N is a positive integer.

The sending module 22 is configured to send the first uplink grant information to the first terminal device.

Optionally, a first-type terminal device and the first terminal device have different capabilities.

Optionally, the first uplink grant information further includes a second field, the second field indicates at least one of whether to perform frequency hopping and an offset value, and the offset value is an offset value for performing frequency hopping transmission on the resource.

Optionally, the second field can indicate at least one of the following bit states:
a first bit state, indicating not to perform frequency hopping;

a second bit state, indicating to perform frequency hopping and that the offset value is a first offset value; or the second bit state is a reserved state;

a third bit state, indicating to perform frequency hopping and that the offset value is a second offset value; or the third bit state is a reserved state; and a fourth bit state, indicating to perform frequency hopping and that the offset value is a third offset value; or the fourth bit state is a reserved state.

Optionally, the offset value includes at least one of $$\frac{1}{4}N, \frac{1}{2}N, \text{ and } -\frac{1}{4}N.$$

Optionally, a correspondence between the at least one bit state and the at least one offset value is predefined, or is configured by using signaling.

Optionally, the offset value is indicated to the first terminal device by using a third field and first information, and the third field is included in the first uplink grant information; and the first information is predefined, or the first information is configured for the first terminal device by using signaling.

Optionally, the sending module 22 is further configured to: send first indication information to the first terminal device, where the first indication information is a first set or a second set, and when a value or a bit state of the first indication information belongs to the first set, the first indication information indicates that a bandwidth resource of the first terminal device is a first resource; and when the value or the bit state of the first indication information belongs to the second set, the first indication information indicates that the bandwidth resource of the first terminal device is a second resource, where the first resource is different from the second resource, or the first resource partially overlaps with the second resource.

Optionally, the determining module 21 is further configured to: determine a value of N based on a bandwidth that can be supported by the first terminal device.

Optionally, the determining module 21 is further configured to: determine a first value based on a capability of the first terminal device; and determine a value of N based on the bandwidth resource and the first value.

Optionally, locations of the N resource blocks are indicated by using second indication information, or locations of the N resource blocks are predefined.

Optionally, the value of N and/or the locations of the N resource blocks are/is indicated by using third indication information, where the third indication information includes first initial uplink BWP configuration information.

The apparatus in some embodiments may be configured to perform the technical solutions of the foregoing method embodiments. An implementation principle and a technical effect of the apparatus are similar to those of the method embodiments, and details are not described herein again.

Figure 6:
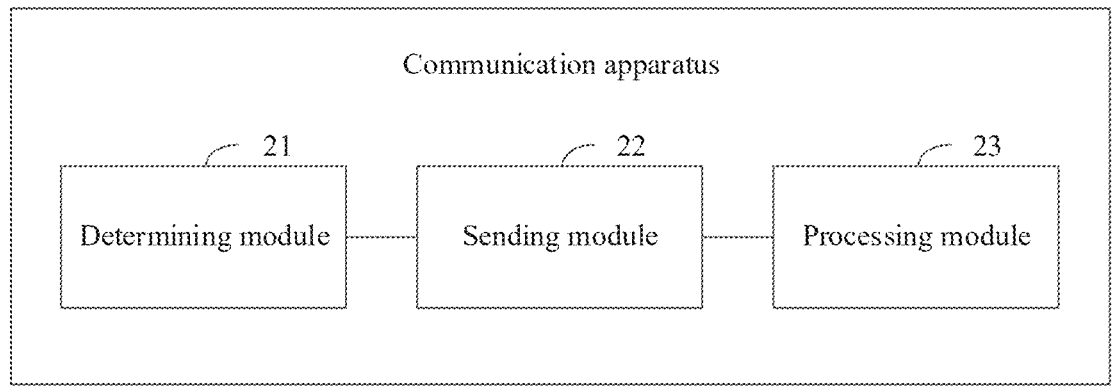
FIG. 6 is a schematic diagram of a structure of an embodiment of a communication apparatus according to this application.

FIG. 6 is a schematic diagram of a structure of an embodiment of a communication apparatus according to this application. As shown in FIG. 6, based on the embodiment shown in FIG. 5, the apparatus in some embodiments may further include a processing module 23. The processing module 23 is configured to indicate, by using second information, whether to perform frequency hopping, where the second information is predefined, or the second information is configured for the first terminal device by using signaling; and when the second information indicates to perform frequency hopping, indicate an offset value during frequency hopping based on a fourth field, where the fourth field is included in the first uplink grant information.

Optionally, the processing module 23 is configured to: when N is within a first value range, indicate, based on the second information, whether to perform frequency hopping; and when N is within a second value range, indicate, based on a fifth field, whether to perform frequency hopping or the offset value during frequency hopping, where the fifth field is included in the first uplink grant information.

Optionally, the processing module 23 is configured to: when N is within the first value range, indicate, by using RRC signaling, whether to perform frequency hopping; and when N is within the second value range, indicate, by using the first uplink grant information, whether to perform frequency hopping.

Optionally, the first uplink grant information does not include a reserved field and/or a channel state information request field.

Optionally, each of at least one field included in the first uplink grant information indicates one piece of information, and the piece of information includes any one or more pieces of the following information: information about whether small packet transmission is allowed, small packet transmission information when small packet transmission is allowed, information about a 2-step random access channel, information about a 4-step RACH, information about whether the first terminal device is allowed to access a network, information about a 5-bit modulation and coding scheme, information about a quantity of repetitions of a scheduled PUSCH, information about a repetition type of the scheduled PUSCH, reporting capability indication information of the first terminal device, type information of the first terminal device, service type information of the first terminal device, subcarrier spacing information, TBS information, and TBS threshold information.

Optionally, the first uplink grant information includes a sixth field, and when a subcarrier spacing used by a resource is u1, a length of the sixth field is N1 bits; and when the subcarrier spacing used by the resource is u2, the length of the sixth field is N2 bits, and N1 is not equal to N2.

The apparatus in some embodiments may be configured to perform the technical solutions of the foregoing method embodiments. An implementation principle and a technical effect of the apparatus are similar to those of the method embodiments, and details are not described herein again.

Figure 7:
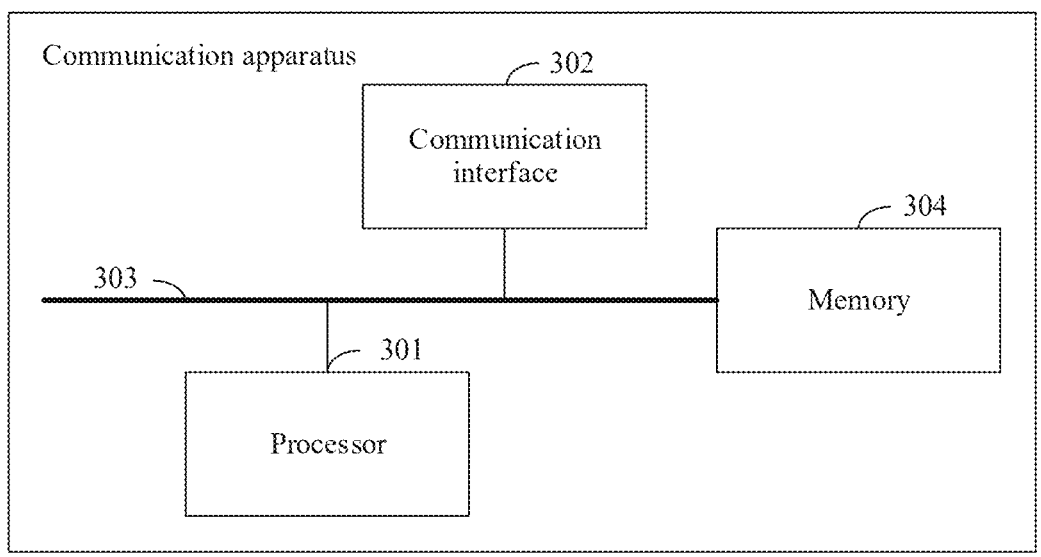
FIG. 7 is a schematic diagram of a structure of a communication apparatus according to this application.

FIG. 7 is a schematic diagram of a structure of a terminal device according to this application. As shown in FIG. 7, the terminal device includes a processor 301 and a communication interface 302.

The processor 301 is configured to execute a computer program stored in a memory, to implement the communication method in the foregoing embodiment. For details, refer to related descriptions in the foregoing method embodiments.

The communication interface 302 may be connected to the processor 301 by using a bus 303. The processor 301 may control the communication interface 302 to implement the foregoing receiving and sending functions of the communication apparatus.

Optionally, some embodiments further includes: a memory 304, configured to store a computer program.

The apparatus may be configured to perform steps and/or procedures corresponding to the terminal device or the access network device in the foregoing method embodiments.

This application further provides a readable storage medium. The readable storage medium stores executable instructions. When at least one processor of a communication apparatus executes the executable instructions, the communication apparatus performs the communication method provided in the foregoing implementations.

This application further provides a program product. The program product includes executable instructions, and the executable instructions are stored in a readable storage medium. At least one processor of a communication apparatus may read the executable instructions from the readable storage medium, and the at least one processor executes the executable instructions, so that the communication apparatus implements the communication method provided in the foregoing implementations.

A person of ordinary skill in the art may understand that all or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A communication method, wherein the method is applicable to a first terminal device, and the method comprises:
   receiving first uplink grant information, wherein the first uplink grant information comprises a first field, and a second field, the first field indicates frequency domain resource allocation information, and a length Y of the first field is less than X, wherein
   X is a pre-specified value, or X is a length of a second frequency domain resource allocation field associated with a second uplink grant format where the first terminal device does not support the second uplink grant format; and
   Y is related to a quantity N of resource blocks supported or configured by the first terminal device, and N is a positive integer; and
   determining a resource for uplink transmission based on the first field, and performing uplink transmission based on the resource, wherein a length of the second field is based on a subcarrier spacing used by the resource.

2. The method according to claim 1, wherein the second field indicates at least one of whether to perform frequency hopping or an offset value.

3. The method according to claim 2, wherein the second field indicates at least one of the following bit states:
   a first bit state, indicating not to perform frequency hopping;
   a second bit state, indicating to perform frequency hopping and that the offset value is a first offset value or the second bit state is a reserved state;
   a third bit state, indicating to perform frequency hopping and that the offset value is a second offset value or the third bit state is a reserved state; or
   a fourth bit state, indicating to perform frequency hopping and that the offset value is a third offset value or the fourth bit state is a reserved state.

4. The method according to claim 2, wherein
   the offset value is determined based on a third field and first information, wherein the third field is comprised in the first uplink grant information; and
   the first information is predefined, or the first information is configured by using signaling.

5. The method according to claim 1 further comprising:
   determining, based on first information, whether to perform frequency hopping, wherein the first information is predefined, or the first information is configured by using signaling; and
   determining an offset value during frequency hopping based on the second field, wherein the second field is comprised in the first uplink grant information.

6. The method according to claim 5, wherein
   when N is within a first value range, whether to perform frequency hopping is determined based on the first information; and
   when N is within a second value range, at least one of whether to perform frequency hopping or determining the offset value during frequency hopping is determined based on a third field, wherein the third field is comprised in the first uplink grant information.

7. The method according to claim 1, wherein each of at least one field comprised in the first uplink grant information indicates one or more pieces of:
   information about whether small packet transmission is allowed, small packet transmission information when small packet transmission is allowed, information about a 2-step random access channel (RACH), information about a 4-step RACH, information about whether the first terminal device is allowed to access a network, information about a 5-bit modulation and coding scheme, information about a quantity of repetitions of a scheduled physical uplink shared channel (PUSCH), information about a repetition type of the scheduled PUSCH, reporting capability indication information of the first terminal device, type information of the first terminal device, service type information of the first terminal device, subcarrier spacing information, transport block set (TBS) information, or TBS threshold information.

8. The method according to claim 1, wherein when the subcarrier spacing used by the resource is u1, the length of the second field is N1 bits; and
   when the subcarrier spacing used by the resource is u2, the length of the second field is N2 bits, and N1 is not equal to N2.

9. A communication method, wherein the method is applicable to an access network device, and the method comprises:
  determining first uplink grant information, wherein the first uplink grant information comprises a first field, and a second field, the first field indicates frequency domain resource allocation information, and a length Y of the first field is less than X, wherein
  X is a pre-specified value, or X is a length of a second frequency domain resource allocation field associated with a second uplink grant format where a first terminal device does not support the second uplink grant format; and
  Y is related to a quantity N of resource blocks supported or configured by the first terminal device, and N is a positive integer; and
  sending the first uplink grant information to the first terminal device, wherein a length of the second field is based on a subcarrier spacing used by a resource.

10. The method according to claim 9, wherein the second field indicates at least one of whether to perform frequency hopping and an offset value.

11. The method according to claim 10, wherein the second field indicates at least one of the following bit states:
  a first bit state, indicating not to perform frequency hopping;
  a second bit state, indicating to perform frequency hopping and that the offset value is a first offset value or the second bit state is a reserved state;
  a third bit state, indicating to perform frequency hopping and that the offset value is a second offset value or the third bit state is a reserved state; or
  a fourth bit state, indicating to perform frequency hopping and that the offset value is a third offset value or the fourth bit state is a reserved state.

12. The method according to claim 10, wherein
  the offset value is indicated to the first terminal device by using a third field and first information, wherein the third field is comprised in the first uplink grant information; and
  the first information is predefined, or the first information is configured for the first terminal device by using signaling.

13. The method according to claim 9, wherein the method further comprises:
  indicating, based on information, whether to perform frequency hopping, wherein the information is predefined, or the information is configured for the first terminal device by using signaling; and
  when the information indicates to perform frequency hopping, indicating an offset value during frequency hopping based on the second field, wherein the second field is comprised in the first uplink grant information.

14. The method according to claim 13, wherein
  when N is within a first value range, whether to perform frequency hopping is determined based on the information; and
  when N is within a second value range, at least one of whether to perform frequency hopping or the offset value during frequency hopping is indicated based on a third field, wherein the third field is comprised in the first uplink grant information; or
  when N is within the first value range, whether to perform frequency hopping is configured by using radio resource control signaling; and
  when N is within the second value range, whether to perform frequency hopping is indicated by using the first uplink grant information.

15. The method according to claim 9, wherein each of at least one field comprised in the first uplink grant information indicates one or more pieces of
  information about whether small packet transmission is allowed, small packet transmission information when small packet transmission is allowed, information about a 2-step random access channel (RACH), information about a 4-step RACH, information about whether the first terminal device is allowed to access a network, information about a 5-bit modulation and coding scheme, information about a quantity of repetitions of a scheduled physical uplink shared channel (PUSCH), information about a repetition type of the scheduled PUSCH, reporting capability indication information of the first terminal device, type information of the first terminal device, service type information of the first terminal device, subcarrier spacing information, transport block set (TBS) information, or TBS threshold information.

16. The method according to claim 9, wherein
  when the subcarrier spacing used by a resource is u1, the length of the second field is N1 bits; and
  when the subcarrier spacing used by the resource is u2, the length of the second field is N2 bits, and N1 is not equal to N2.

17. An apparatus, comprising:
  one or more processors; and
  one or more memories coupled to the one or more processors and storing programming instructions for execution by the one or more processors to cause the apparatus to perform a method comprising:
  receiving first uplink grant information, wherein the first uplink grant information comprises a first field, and a second field, the first field indicates frequency domain resource allocation information, and a length Y of the first field is less than X, wherein
  X is a pre-specified value, or X is a length of a second frequency domain resource allocation field associated with a second uplink grant format where the apparatus does not support the second uplink grant format; and
  Y is related to a quantity N of resource blocks supported or configured by the apparatus, and N is a positive integer; and
  determining a resource for uplink transmission based on the first field, and performing uplink transmission based on the resource, wherein a length of the second field is based on a subcarrier spacing used by the resource.

18. The apparatus according to claim 17, wherein the second field indicates at least one of whether to perform frequency hopping or an offset value.

19. The apparatus according to claim 18, wherein the second field indicates at least one of the following bit states:
  a first bit state, indicating not to perform frequency hopping;
  a second bit state, indicating to perform frequency hopping and that the offset value is a first offset value or the second bit state is a reserved state;
  a third bit state, indicating to perform frequency hopping and that the offset value is a second offset value or the third bit state is a reserved state; and
  a fourth bit state, indicating to perform frequency hopping and that the offset value is a third offset value or the fourth bit state is a reserved state.

20. The apparatus according to claim 18, wherein
the offset value is determined based on a third field and
information, wherein the third field is comprised in the
first uplink grant information; and
the information is predefined, or the information is configured by using signaling.

\* \* \* \* \*